(12) United States Patent
Karandinos et al.

(10) Patent No.: US 6,747,114 B2
(45) Date of Patent: Jun. 8, 2004

(54) POLYPROPYLENE-BASED ADHESIVE COMPOSITIONS

(75) Inventors: Anthony G. Karandinos, St. Stevens-Woluwe (BE); Keith A. Nelson, Baton Rouge, LA (US); Jean M. Tancrede, Baton Rouge, LA (US); Bruce A. Harrington, Houston, TX (US); David J. Lohse, Bridgewater, NJ (US); Olivier J. F. Georjon, Brussels (BE); Kenneth Lewtas, Tervuren (BE); Sudhin Datta, Houston, TX (US); Charles Cozewith, Bellaire, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 125 days.

(21) Appl. No.: 09/745,394

(22) Filed: Dec. 21, 2000

(65) Prior Publication Data

US 2002/0019507 A1 Feb. 14, 2002

Related U.S. Application Data

(60) Provisional application No. 60/171,715, filed on Dec. 22, 1999, and provisional application No. 60/199,093, filed on Apr. 21, 2000.

(51) Int. Cl.⁷ .................. C08F 210/06; C08L 23/14; C08L 23/26
(52) U.S. Cl. ............. 526/348.2; 526/348; 526/348.5; 526/348.6; 525/240; 525/326.1; 525/333.7; 525/333.8
(58) Field of Search .............. 525/326.1, 240, 525/333.7, 333.8; 526/348, 348.2, 348.5, 348.6

(56) References Cited

U.S. PATENT DOCUMENTS

| | | | |
|---|---|---|---|
| 3,378,606 A | 4/1968 | Kontos | 260/878 |
| 3,853,969 A | 12/1974 | Kontos | 260/878 |
| 3,882,197 A | 5/1975 | Fritz, et al. | 260/897 |
| 3,888,949 A | 6/1975 | Shih | 260/897 |
| 4,143,099 A | 3/1979 | Duncan | 260/897 |
| 4,345,349 A | 8/1982 | Flanagan | 412/5 |
| 4,394,915 A | 7/1983 | Nelson | 215/12 R |
| 4,461,872 A | 7/1984 | Su | 525/240 |
| 4,743,391 A | 5/1988 | Gordon et al. | 252/55 |
| 4,749,505 A | 6/1988 | Chung et al. | 252/51.5 |
| 5,118,762 A | 6/1992 | Chin | 525/314 |
| 5,705,568 A | 1/1998 | Gahleitner et al. | 525/194 |

FOREIGN PATENT DOCUMENTS

| | | | |
|---|---|---|---|
| EP | 716 121 A1 | * | 6/1996 |
| EP | 0 716 121 A | | 6/1996 |
| EP | 870 794 A1 | * | 10/1998 |
| EP | 0 870 794 A | | 10/1998 |
| WO | WO 95/10575 | * | 4/1995 |
| WO | WO 95 10575 | | 4/1995 |
| WO | WO 97/33921 | | 9/1997 |
| WO | WO 99 20664 | | 4/1999 |
| WO | WO 00 01745 | | 1/2000 |

OTHER PUBLICATIONS

J.W. Collette, et al., "Elastomeric Polypropylenes from Alumina–Supported Tetraalkyl Group IVB Catalysts. 1. Synthesis and Properties of High Molecular Weight Stereoblock Homopolymers", *Macromolecules*, vol. 22, (1989), pp. 3851–3858.

Tzoganakis, et al. "Production of Controlled–Rheology Polypropylene Resins by Peroxide Promoted Degradation During Extrusion", *Polymer Engineering and Science*, vol. 28, No. 3, (1988), pp. 170–180.

Rosales, et al., "Viscoelastic Behavior of Controlled–Rheology Polypropylene Resins", *Materials Engineering*, vol. 4, No. 2, (1993), pp. 153–169.

* cited by examiner

*Primary Examiner*—Robert Rabago
(74) *Attorney, Agent, or Firm*—Leandro Arechederra

(57) ABSTRACT

An adhesive blend is described that can include a semi-crystalline copolymer of propylene and at least one comonomer selected from the group consisting of ethylene and at least one $C_4$ to $C_{20}$ α-olefin, the copolymer having a weight average molecular weight (Mw) from about 15,000 to about 200,000; an melt index (MI) from about 7 dg/min to about 3000 dg/min as measured by ASTM D 1238(B), and a (Mw/Mn) of approximately 2. Various production processes are also described. Also described are adhesive compositions and methods for making adhesive compositions having polymers or polymer blends with melt flow rates (MFRs) equal to and above 250° dg/min. at 230° C. Certain specific embodiments of the invention involve the use of a free radical initiator, e.g., a peroxide.

17 Claims, No Drawings

POLYPROPYLENE-BASED ADHESIVE COMPOSITIONS

RELATED APPLICATIONS

This applications is related to and claims priority from U.S. Ser. No. 60/171,715, filed Dec. 22, 1999, which is fully incorporated by reference for U.S. patent practice, and to U.S. Ser. No. 60/199,093, filed Apr. 21, 2000, which is fully incorporated by reference for U.S. patent practice.

FIELD OF INVENTION

The present invention relates to the use of propylene copolymers in adhesive applications. A specific embodiment of the invention is directed to copolymers of propylene and ethylene or propylene and at least one $C_4$ to $C_{20}$ α-olefin, preferably a $C_4$ to $C_8$ α-olefin where the propylene is the predominant monomer and the copolymer is semi-crystalline. Another specific embodiment of the invention relates to adhesive compositions and methods for making adhesive compositions with polymers or polymer blends having melt flow rates (MFRs) of 250 dg/min. at 230° C. and higher. Certain specific embodiments of the invention involve the use of a free radical initiator, e.g., a peroxide.

BACKGROUND

Hot-melt adhesives are thermoplastic materials that can be heated to a melt and then applied to various substrates. A bond is formed upon cooling and resolidification. Among the most widely used thermoplastic polymers in hot-melt adhesives is ethylene-vinyl acetate copolymer ("EVA") which is combined with a variety of plasticizers, tackifiers, antioxidants, waxes, and extenders for purposes of improving and/or controlling the viscosity, adhesive properties, shelf-life, stability and cost. Plasticizers have typically included such compounds as polybutenes and phthalates, tackifiers have typically included such compositions as rosin esters and hydrocarbon resins, antioxidants are frequently based upon the known hindered phenol compounds, and wax helps to reduce the melt viscosity in addition to reducing costs.

These hot-melt adhesives have the drawback of often becoming brittle below the glass-transition temperature. Historically, ethylene based semi-crystalline polymers like polyethylene and ethylene vinyl acetate (EVA), have been used in various adhesive applications; however, such polymers have many problems in their end use applications. For example, semi-crystalline linear low density polyethylene (LLDPE) can be used in hot melt adhesive applications where the crystalline network formed on cooling makes a good adhesive free of tack, but the high level of crystallinity causes the material to be brittle. For this reason other monomers, such as vinyl acetate (VA), or alpha-olefins are often co-polymerized with ethylene to break up some of the crystallinity and soften the adhesive. Thus the use of hot-melt adhesives based upon EVA is limited when low temperature conditions of use are desired.

Styrene block copolymers ("SBC") are independently known as an important class of base polymers for adhesive compositions, particularly for such uses as in hot melt pressure sensitive adhesives in tapes, label stock, diaper assembly and the like. However, because of higher melt viscosities than EVA based compositions, SBC based adhesive compositions are not typically used for packaging where high-speed application is economically desirable.

Certain adhesive composition blends of SBC and EVA are known, even though the base polymers are largely incompatible, in the sense of not being able to form stable blends largely free of separation or stratification and resulting nonuniformity of properties. U.S. Pat. No. 4,345,349 describes book-binding hot-melt adhesive compositions prepared from 15–30% SBC, 5–10% EVA, 25–40% rosin ester tackifier, 25–35% wax diluent and 0.5–3% of a stabilizer, e.g., hindered phenol compound. The ratio of SBC to the ethylene vinyl acetate copolymer is from 1.75/1 to 6/1. The low-temperature flexibility improves by increasing the amount of SBC in the composition and using a high softening point tackifier or high melting point wax shortens setting speed. Setting time, in order to be useful in the described bookbinding process, is to be within 30 seconds, and times within 26 seconds are exemplified. U.S. Pat. No. 4,394,915 describes a hot melt adhesive particularly suitable for polyethylene-terepthalate bottle assemblies comprising typically 20–40% SBC, 5–20% EVA, 30–60% tackifying resin, 10–30% wax or oil, and 0.1–4% stabilizer. The tackifying resin can be any of a number of available rosins or resins, including the aliphatic petroleum resins, but is preferably a polymerized tall oil rosin.

PCT/US97/04161 teaches the use of ethylene based copolymers as hot melt adhesive and these materials are useful in some applications, but suffer in that they have higher melt viscosity, poorer processing and poorer adhesion to some types of surfaces than propylene based copolymers. U.S. Pat. No. 5,118,762 addresses the industrial need for hot melt adhesives that have a low melt viscosity and high temperature resistance to shear. The solution in this document is the use of a predominantly branched styrene-isoprene-styrene (SIS) triblock copolymer with a tackifying resin that is compatible with the elastomeric isoprene block, e.g., diene-olefin copolymer resins, rosin esters or saturated petroleum resins, e.g., hydrogenated dicyclopentadiene resins such as ESCOREZ® 5000 series resins of the Exxon-Mobil Chemical Company.

Blends of isotactic polypropylene and ethylene propylene rubber are well known in the prior art, prior art Ziegler-Natta catalyst systems could only produce ethylene propylene rubber compositions with greater than 30% by weight ethylene at practical, economic polymerization conditions. There exists a need for polymeric materials which have advantageous processing characteristics while still providing suitable end properties to articles formed therefrom, e.g., tensile and impact strength. Copolymers and blends of polymers have been developed to try and meet the above needs. U.S. Pat. No. 3,882,197 to Fritz et al. describes blends of stereoregular propylene/alpha-olefin copolymers, stereoregular propylene, and ethylene copolymer rubbers. In U.S. Pat. No. 3,888,949 Chi-Kai Shih, assigned to E I DuPont, shows the synthesis of blend compositions containing isotactic polypropylene and copolymers of propylene and an alpha-olefin, containing between 6–20 carbon atoms, which have improved elongation and tensile strength over either the copolymer or isotactic polypropylene. Copolymers of propylene and alpha-olefin are described wherein the alpha-olefin is hexene, octene or dodecene. However, the copolymer is made with a heterogeneous titanium catalyst which makes copolymers which are non-uniform in compositional distribution and typically broad in molecular weight distribution. Compositional distribution is a property of copolymers where there exists statistically significant intermolecular or intramolecular difference in the composition of the polymer.

In U.S. Pat. No. 4,461,872, A. C. L. Su improved on the properties of the blends described in U.S. Pat. No. 3,888,949 by using another heterogeneous catalyst system. However, the properties and compositions of the copolymer with respect to either the nature and type of monomers (alpha-olefin containing 6–20 carbon atoms) or the blocky heterogeneous intra/inter molecular distribution of the alpha-olefin in the polymer have not been resolved since the catalysts used for these polymerization of propylene and alpha-olefin are expected to form copolymers which have statistically significant intermolecular and intramolecular compositional differences.

In two successive publications in the journal of Macromolecules, 1989, v22, pages 3851–3866, J. W. Collette of E. I. DuPont has described blends of isotactic polypropylene and partially atactic polypropylene which have desirable tensile elongation properties. However, the partially atactic propylene has a broad molecular weight distribution as shown in FIG. 8 of the first publication. The partially atactic polypropylene is also composed of several fractions, which differ in the level of tacticity of the propylene units as shown by the differences in the solubility in different solvents. This is shown by the corresponding physical decomposition of the blend which is separated by extraction with different solvents to yield individual components of uniform solubility characteristics as shown in Table IV of the above publications.

In U.S. Pat. Nos. 3,853,969 and 3,378,606, E. G. Kontos discloses the formation of in situ blends of isotactic polypropylene and "stereo block" copolymers of propylene and another olefin of 2 to 12 carbon atoms, including ethylene and hexene. The copolymers of this invention are necessarily heterogeneous in intermolecular and intramolecular composition distribution. This is demonstrated by the synthesis procedures of these copolymers which involve sequential injection of monomer mixtures of different compositions to synthesize polymeric portions of analogously different compositions. In addition, FIG. 1 of both patents shows that the "stereo block" character, which is intra or intermolecular compositional differences in the context of the description of the present invention, is essential to the benefit of the tensile and elongation properties of the blend. In situ blends of isotactic polypropylene and compositionally uniform random ethylene propylene copolymers have poor properties.

Amorphous polyolefins, such as atactic polypropylene, have no crystalline network and thus have poor cohesive strength. To improve cohesive strength high molecular weight amorphous polyolefins are needed in high concentrations and this leads to high viscosity and poor processability.

Moreover, all of these compositions either do not meet all of the desired properties for various applications, and/or involve costly and burdensome process steps to achieve the desired results. It is also desirable in packaging to have adhesive compositions that have suitably low melt viscosity for high speed automated coating processes, a sufficiently long time before hardening to preserve sufficient adhesion (known in industry as "open time") in assembly operations such as box closures, yet a quick enough setting speed to allow shortest time application of adhering pressure (known in industry as "setting time").

As set forth in greater detail below, certain aspects of this invention relate to the use of a peroxide or other free-radical initiator to provide a modified polymer or polymer blend. The use of peroxide to degrade certain polymers has been published in the literature.

For example, peroxide-initiated degradation of certain polypropylene resins is discussed generally in the article by Tzoganakis, et al., entitled "Production of Controlled-Rheology Polypropylene Resins by Peroxide Promoted Degradation During Extrusion," pp. 170–180, Polymer Engineering and Science, Vol. 28, No. 3 (1988), and in the article by Rosales, et al, entitled "Viscoelastic Behavior of Controlled-Rheology Polypropylene Resins," pp. 153–169, Materials Engineering, Vol. 4, No. 2 (1993).

Gahleitner et al., U.S. Pat. No. 5,705,568, relates to chemically degraded block copolymers. That patent discusses the use of peroxides to degrade elastic polypropylene homopolymers and copolymers with stereoregular block arrangements, blocks of isotactic and atactic propylene sequences. The patent discloses using minor amounts of peroxide, from 0.001 to 0.8% by weight, preferably 0.05% to 0.5% by weight to raise the melt flow index (MFI). The patent also discloses the addition of fillers, stabilizers and mould release agents. However, this patent does not discuss adhesive compositions.

Peroxides have also been used to oxidatively degrade olefinic polymers and/or polymer blends useful as lubricant compositions, as discussed, for example, in Gordon et al., U.S. Pat. No. 4,743,391 and Chung et al., U.S. Pat. No. 4,749,505.

Peroxides have also been used as curing agents in elastomeric blends. Duncan, U.S. Pat. No. 4,143,099, for example, discusses the use of peroxides in curing and "semi-curing" elastomeric blends, by adding the peroxide curing agent while masticating and shearing the mixture of polymers, and completing the semi-curing of the polymers before the onset of melting.

The present invention is directed in general to providing improved adhesive compositions, and processes or methods for making such compositions.

SUMMARY

One or more specific embodiments of the present invention relates to an adhesive blend comprising a semi-crystalline copolymer of propylene and at least one comonomer selected from the group consisting of ethylene and at least one $C_4$ to $C_{20}$ α-olefin, the copolymer having a weight average molecular weight (Mw) from about 15,000 to about 200,000; an melt index (MI) from about 7 dg/min to about 3000 dg/min, and a (Mw/Mn) of approximately 2.

Other specific embodiments relate to a polymerization process comprising: reacting propylene and at least one comonomer selected from the group consisting of ethylene and at least one $C_4$ to $C_{20}$ α-olefin, under polymerization conditions in the presence of a metallocene catalyst capable of incorporating the propylene sequences into isotactic or syndiotactic orientations, in at least one reactor to produce a first copolymer having at least 65 mole % propylene and wherein preferably at least 40% of the propylene sequences are in isotactic or syndiotactic orientations; wherein the copolymer has a melt index (MI) from about 7 dg/min to about 3000 dg/min.

Still further embodiments relate to articles of manufacture comprising the aforementioned compositions or other compositions disclosed herein. The article of manufacture may be a sanitary article, such as a diaper, feminine hygiene article and so forth.

Certain specific embodiments of the invention relate to adhesive compositions that include a polymer or blend of polymers in which the polymer or blend of polymers themselves have an MFR greater than about 250 g/10 min. at 230° C., and processes for making such adhesive compositions. It is understood that while the overall composition may include additional ingredients that may further increase the overall MFR of the composition, it is the MFR of the actual polymer or polymer blend itself that is referred to herein. Advantageously, therefore, additional treatment steps, e.g., post-extrusion, or MFR-increasing additives are not necessarily required, since the polymer or blend of polymers itself possesses the desired MFR.

Preferably, the polymer or polymer blend has a melting point of from 60 to 120 degrees C., more preferably from 80 to 100 degrees C. Also, the polymer or polymer blend preferably includes ethylene (or an alpha olefin, e.g., having from 4–20 carbon atoms) in the amount of up to 30 mole %, preferably from 3 mole % to 20 mole % and more preferably from 7 mole % to 15 mole wt %. In this context, the ethylene or alpha olefin can be units forming part of a random semicrystalline copolymer that includes both propylene units and ethylene units, e.g., when a single copolymer is used (not a blend). Alternatively, a blend can be used in which isotactic polypropylene is blended with a polyethylene, in which case the ethylene units in the polyethylene should be up to 30 mole % of the overall polymer blend. As discussed in greater detail below, it is contemplated that while the presence of ethylene units may provide the desired melting point, those same ethylene units may cause crosslinking to such an extent that the MFR is decreased rather than increased, and for that reason, the amount of ethylene should be limited.

In other specific embodiments, adhesive compositions are described containing polymers or polymer blends having an MFR greater than about 250 dg/min. at 230° C., wherein the composition preferably includes a random copolymer produced by copolymerizing propylene and at least one of ethylene or alpha-olefin having 20 or less carbon atoms, preferably 8 or less carbon atoms, the random copolymer having a crystallinity at least about 2% and no greater than about 65% derived from stereoregular polypropylene sequences and a melting point of from about 25° C. to about 105° C. Preferably, the random copolymer has a melting point.

In still other specific embodiments, adhesive compositions are described, which include the reaction product of a free radical initiator and a random copolymer produced by copolymerizing propylene and at least one of ethylene or alpha-olefin having 8 or less carbon atoms, the random copolymer having a crystallinity at least about 2% and no greater than about 65% derived from stereoregular polypropylene sequences and a melting point of from about 25° C. to about 105° C. Preferably, this reaction product has an MFR greater than about 250 g/10 min. at 23° C.

Yet another specific embodiment of this invention includes a random polymer with a melting point between about 60° C. and 140° C., more preferably between 80° C. and 110° C. The viscosity as measured by melt flow rate at 230° C. should be between 2 and 5600, more preferably between 70 and 370, and most preferably between 300 and 1800. Correspondingly, the melt index, measured at 190° C., should be between 20 and 1500, more preferably between 40 and 1000, and most preferably between 100 and 500. Further, the tensile elongation of the polymer at room temperature should be in excess of 50%, more preferably in excess of 100%, and most preferably in excess of 300%. Preferably, the random copolymer is a low molecular weight copolymer containing propylene units in an amount of 80% or above, preferably more than 90%, with the propylene units preferably being predominantly isotactic sequences (more than 80% of the units being isotactic pentads), as measured by C-13 NMR. The random copolymers can have long chain branching, providing greater flexibility for desired rheological properties.

Still another specific embodiment of the invention includes a polyolefin composition containing a physical blend, wherein an ethylene-propylene copolymer is blended together with isotactic polypropylene. Those ethylene-propylene copolymers are preferably derived by solution polymerization using chiral metallocene catalysts. Those ethylene-propylene copolymers preferably have crystallinity derived from isotactic propylene sequences. In those blend compositions, the composition of the copolymers includes up to 30 wt % and preferably up to 20 wt % ethylene. Those copolymers may be linear or branched. Those blends preferably contain substantial amounts of isotactic polypropylene, at least about 5 to 10 wt %. In a specific embodiment, the blend can include isotactic polypropylene in an amount up to about 50 wt %, or alternatively up to about 80 wt %. The blend can also include other olefin-based polymers, such as reactor copolymers and impact copolymers. Desirably, the use of the blends described above provide for favorable melting temperatures due to the presence of the isotactic polypropylene while providing a separate molecular architecture for the copolymer, thus improving the rheology, elasticity and flexibility of the adhesive composition.

Another specific embodiment of this invention relates to a process for making a modified adhesive composition. For example, a process is described that includes (a) providing a first polymer composition having an MFR less than 250 dg/min. at 230° C. and including a random copolymer produced by copolymerizing propylene and at least one of ethylene or alpha-olefin having 8 or less carbon atoms, the random copolymer having a crystallinity at least about 2% and no greater than about 65% derived from stereoregular polypropylene sequences and a melting point of from about 25° C. to about 105° C; and (b) contacting the first polymer composition, in the melted state, with a free radical initiator, to provide a second polymer composition, wherein the second polymer composition has an MFR greater than 250 dg/min. at 230° C.

A specific embodiment of a process for making an adhesive composition utilizes chain scission to attain low molecular weight polymers from polymers of much higher molecular weight. This chain scission procedure may be used for both a composition that includes a random copolymer and a composition that includes a blend of the random copolymer and a crystalline polymer, e.g., isotactic polypropylene. The chain scission procedure may include heating the polymer, or polymer blend, to a molten state in the presence of a free radical initiator, i.e., an agent capable of producing free radicals. In the case of a blend, the polymer components may both be simultaneously treated with the free radical initiator, to cause the desired level or degree of degradation. Alternatively, only one of the components may be treated with the free radical initiator, to cause the desired level or degree of degradation, following which the other component may then be added after degradation has begun or been completed. In either case, the temperature of the polymer, or blend, should be sufficiently high when the initiator is present to maintain all of the components in the molten state. The degradation may be performed in any number of environments, using conventional mixing procedures. When a batch mode is used, degradation should be carried out in an intensive mixer such as a masticator or a Brabender mixer. When a continuous mode is used, degradation should be carried out in an extruder to which the components should be continuously fed. It is understood that the molecular weights of the individual blend components (e.g, the random copolymer and the isotactic polypropylene)

after chain scission are related to the initial molecular weights of each component. However, each of the components undergoes chain scission at separate rates. Accordingly, the molecular weights of the initial components should be adjusted to obtain the desired molecular weight distribution in the final composition after chain scission. Also, chain scission of the random copolymer leads to branching, which is desirable for the adhesive composition.

DETAILED DESCRIPTION

Various specific embodiments, versions and examples of the invention will now be described, including preferred embodiments and definitions that are adopted herein for purposes of understanding the claimed invention. It is understood, however, that the scope of the "invention" will refer to the appended claims, including equivalents. All references to the "invention" below are intended to distinguish claimed compositions and methods from compositions and methods not considered to be part of this invention. It is understood, therefore, that any reference to the "invention" may refer to one or more, but not necessarily all, of the inventions defined by the claims.

Polymer Products

Certain embodiments relate to specific types of propylene based semicrystalline copolymers, polyolefins that have been largely overlooked in adhesive applications. For example, certain propylene based copolymers having isotactic sequences have lower melt viscosity than ethylene based copolymers and would therefore process better, especially in sprayed adhesive applications. In addition, propylene based copolymers have higher peak melt points than ethylene based copolymers and could therefore be expected to have higher use temperatures. Finally, certain propylene based copolymers have improved adhesive strength compared to propylene homopolymers.

One embodiment of the present invention is an adhesive blend preferably comprising a copolymer of propylene and at least one comonomer selected from the group consisting of ethylene and at least one $C_4$ to $C_{20}$ α-olefin, preferably having an average propylene content of from at least about 65 mol % and more preferably from at least about 73 mol %, and most preferably from at least about 85 mol %. Further, the propylene copolymer has a weight average molecular weight (Mw) preferably from about 15,000 to about 200,000 Daltons; more preferably between about 50,000 and about 150,000 Daltons; and most preferably between about 65,000 and about 100,000 Daltons. Preferably, the propylene copolymer is a semi-crystalline propylene copolymer. The semi-crystalline propylene copolymer preferably has a melt index (MI) as measured by ASTM D 1238(B) of from about 3000 dg/min to about 7 dg/min, more preferably from about 20 dg/min to about 900 dg/min, and most preferably from about 78 to about 630 dg/min. Additionally, the semi-crystalline propylene copolymer can have a melt index of from about 10 dg/min to about 2500 dg/min, or from about 15 dg/min to about 2000 dg/min. The propylene sequences in the propylene copolymer may be either isotactic propylene sequences or syndiotactic propylene sequences, preferably isotactic sequences. The crystallinity in the propylene copolymer is to be derived from either the isotactic or syndiotactic propylene sequences.

One preferred semicrystalline polymer (SCP) is a thermoplastic copolymer, preferably random, of ethylene and propylene having a melting point by Differential Scanning Calorimetry (DSC) analysis (ASTM E-794-95) of from about 25° C. to about 120° C., preferably in the range of from about 30° C. to about 110° C., more preferably in the range of from about 65° C. to about 100° C. The semi-crystalline polymer preferably has a weight average molecular weight/number average molecular weight ratio (Mw/Mn) of approximately 2. A preferred semi crystalline polymer used in the present invention is described in detail as the "First Polymer Component (SPC)" in co-pending U.S. application Ser. No. 60/133,966, filed May 13, 1999, which is incorporated by reference herein. The semi-crystalline polymer preferably has a heat of fusion from about 30 J/g to about 80 J/g as determined by DSC, more preferably from about 40 J/g to about 70 J/g as determined by DSC, and most preferably from about 50 J/g to about 65 J/g as determined by DSC.

A preferred procedure used in the present application for Differential Scanning Calorimetry (DSC) is described as follows. Preferably, about 6 mg to about 10 mg of a sheet of the preferred polymer pressed at approximately 200° C. to 230° C. is removed with a punch die and is annealed at room temperature for 48 hours. At the end of this period, the sample is placed in a Differential Scanning Calorimeter (Perkin Elmer 7 Series Thermal Analysis System) and cooled to about −50° C. to −70° C. The sample is heated at about 10° C./min to attain a final temperature of about 180° C. to about 200° C. The thermal output is recorded as the area under the melting peak of the sample which is typically at a maximum peak at about 30° C. to about 175° C. and occurs between the temperatures of about 0° C. and about 200° C. The thermal output is measured in Joules as a measure of the heat of fusion. The melting point is recorded as the temperature of the greatest heat absorption within the range of melting temperature of the sample.

A SCP of the present invention preferably comprises a random crystallizable copolymer having a narrow compositional distribution. The term "crystallizable," as used herein for SCP, describes those polymers or sequences which are mainly amorphous in the undeformed state, but can crystallize upon stretching, annealing or in the presence of a nucleating agent, such as a crystalline polymer or a crystalline segment within the polymer. Crystallization is measured by DSC, as described herein. While not meant to be limited thereby, it is believed that the narrow composition distribution of the first polymer component is important. The intermolecular composition distribution of the polymer is determined by thermal fractionation in a solvent. A typical solvent is a saturated hydrocarbon such as hexane or heptane. This thermal fractionation procedure is described in previously mentioned U.S. Ser. No. 60/133,966, incorporated herein by reference. Typically, approximately 75 weight % and more preferably 85 weight % of the polymer is isolated as a one or two adjacent, soluble fraction with the balance of the polymer in immediately preceding or succeeding fractions. Each of these fractions has a composition (mol % ethylene content) with a difference of no greater than 27 mol % (relative) and more preferably 14 mol % (relative) of the average mol % ethylene content of the whole first polymer component. The first polymer component is narrow in compositional distribution if it meets the fractionation test outlined above.

In semi-crystalline polymers, the length and distribution of stereo-regular propylene sequences is consistent with the substantially random statistical crystallizable co-polymerization. It is well known that sequence length and distribution are related to the co-polymerization reactivity ratios. By substantially random, we mean copolymer for which the product of the reactivity ratios is preferably 2 or less, more preferably 1.5 or less, and most preferably 1.2 or less.

In stereo-block structures, the average length of PP sequences is greater than that in substantially random copolymers with a similar composition. Prior art polymers with stereo-block structure have a distribution of PP sequences consistent with these blocky structures rather than a substantially random statistical distribution. To produce a crystallizable copolymer with the required randomness and narrow composition distribution, it is desirable to use (1) a single sited catalyst and (2) a well-mixed, continuous flow stirred tank polymerization reactor which allows only a single polymerization environment for substantially all of the polymer chains of the first polymer component.

The SCP of the present inventive composition comprises preferably isotactically crystallizable alpha-olefin sequences, e.g., preferably propylene sequences (NMR). The crystallinity of the first polymer component is, preferably, according to one embodiment, from 1% to 65% of isotactic polypropylene, preferably between 3% to 30%, as measured by the heat of fusion of annealed samples of the polymer. The SCP preferably has a poly dispersity index (PDI) or Mw/Mn between 1.5 to 40, more preferably between about 1.8 to 5 and most preferably between 1.8 to 3. Preferably, the SCP has a Mooney viscosity of ML (1+4)@125° C. less than 40, more preferably less than 20 and most preferably less than 10. It is preferred that the SCP has a melt index (MI) at 190° C. of less than about 1500 dg/min, more preferably less than about 900 dg/min, and most preferably less than 650 dg/min. Further, the semi-crystalline propylene copolymer can also have a melt index of from about 10 dg/min to about 2500 dg/min, or from about 15 dg/min to about 2000 dg/min, or even more broadly from about 7 dg/min to about 3000 dg/min.

The low levels of crystallinity in the SCP are obtained by incorporating from about 0.5 to 50 mol % alpha-olefin, preferably from about 0.9 to about 35 mol % alpha-olefin; more preferably, it comprises from about 1.3 to about 37 mol % alpha-olefin, and; most preferably between about 1.3 to about 15 mol % alpha-olefin. Alpha olefins are defined herein to comprise one or more members of the group consisting of ethylene and $C_4$–$C_{20}$ alpha-olefin. At alpha-olefin compositions lower than the above lower limits for the composition of the SCP, the blends of the SCP are thermoplastic. At alpha-olefin compositions within the stated desired ranges, the blends exhibit superior tensile strength. At alpha-olefin compositions higher than the above higher limits for the SCP, the blends have poor tensile strength. It is believed, while not meant to be limited thereby, the SCP needs to have the optimum amount of isotactic polypropylene crystallinity to crystallize for the beneficial effects of the present invention. As discussed above, the most preferred co-monomer is ethylene.

Preferably, the adhesive blend further comprises one or more additives, such as tackifiers, plasticizers (extender oils), waxes, colorants, antioxidants, fillers and others conventionally used in adhesive blends. More preferably, the adhesive composition comprises from 0 to about 80 weight percent of at least one tackifier; from 0 to about 60 weight percent of at least one plasticizer; and from 0 to about 50 weight percent of at least one wax; from 0 to about 5 weight percent of an anti-oxidant, wherein the sum of the components (b), (c), and (d) comprises from about 5 to about 95 weight percent of said adhesive composition.

Suitable plasticizers or extender oils include aromatic, naphthenic, paraffinic, or hydrogenated (white) oils and mixtures thereof. One of the particular advantages of the invention is that none or only minor amounts of extender oil may be required to achieve good flow and coating characteristics because of the inherently low melt viscosity properties of the adhesive of the invention. Reduction in the level of extender oil required to process the composition tends to result in improved cohesiveness of the adhesive and reduces bleed out of the extender. Where used, the extender oil is added at a level from about 0.5 to about 25 parts by weight per hundred parts by weight of the SCP, more preferably from about 5 to 15 parts by weight.

Suitable antioxidants include hindered phenols such as 2,6-di-t-butyl-4-methylphenol; 1,3,5-trimethyl-2,4,6-tris (3', 5'-di-t-butyl-4'-hydroxybenzyl)-benzene; tetrakis [(methylene (3,5-di-t-butyl-4-hydroxyhydrocinnamate)] methane (IRGANOX™ 1010, commercially available from Ciba Geigy, New York); octadecyl-3,5-di-t-butyl-4-hydroxy cinnamate (IRGANOX™ 1076, commercially available from Ciba Geigy); and like known materials. Where present, the antioxidant is used at a preferred level of from about 0.05 to about 2 parts by weight per 100 parts by weight of composition. The stabilizing additives, antioxidants, and/or UV stabilizers used in accordance with the invention, are well known conventionally and described in the literature, see for example, U.S. Pat. No. 5,143,968 and U.S. Pat. No. 5,656,698. These patents are expressly incorporated by reference for their teachings as to antioxidant stabilizers and plasticizer oils.

The primary tackifying resins useful in the practice of this invention preferably include hydrocarbon resins, synthetic polyterpenes, rosin, rosin esters and natural terpenes which are solids, semi-solids, or liquids at room temperature. The various types of resins are described in U.S. Pat. No. 5,143,968, incorporated herein by reference. The preferred tackifying resins are aliphatic hydrocarbon resins such as (1) resins resulting from the polymerization of monomers consisting of olefins and diolefins (e.g., Escorez® 1310LC, Escorez® 2596 of ExxonMobil Chemical Company, Houston, Tex.) and the hydrogenated version thereof; alicyclic petroleum hydrocarbon resins and the hydrogenated derivatives (e.g. Escorez® 5300 and 5400 series from ExxonMobil Chemical; Eastotac® resins from Eastman Chemical, Kingsport, Tenn.); (3) polyterpene resins and hydrogenated derivatives; (4) hydrogenated C9 (e.g., Arkon® P series from Arakawa Chemical; Regalrez® and Regalite R® from Hercules, Wilmington, Del.). The tackifier resins may also be modified with some aromatic components, such as Escorez® 2596 commercially available from ExxonMobil Chemical Co., the level of which should not be too high to cause incompatibility with the SCP of this invention. The hot melt adhesive compositions of the invention preferably will contain from about 20 to about 70 wt. %, more preferably from about 35 to about 60 wt. % tackifying resin.

The wax component of the invention adhesive compositions will be any of those conventionally known for use with EVA in hot melt adhesive compositions. Exemplary petroleum derived synthetic waxes are paraffin and microcrystalline waxes having melting points within a range of from about 55° C. to about 110° C. as well as low molecular weight polyethylene and Fischer-Tropsch waxes. The wax content is preferably from about 10 to about 35 wt. % of the total blend composition. Plasticizers, pigments and fillers may be used along with or in place of a portion of the wax. Plasticizer oils can be used, see U.S. Pat. No. 5,143,968, incorporated herein by reference, for description of suitable oils.

As indicated above, the components forming the adhesive formulations of the invention have properties such that adhesives having a very low melt viscosity are provided, thereby facilitating flow of the adhesive through the coating apparatus, e.g., coating die, without resorting to the inclusion of solvents or excess extender oil into the composition. Melt viscosities of less than 10,000 centipoise measured at 180° C. per ASTM D 3236 can be readily achieved for the adhesive blend. The more preferred melt viscosity at 180° C. is less than 2,000 cps and the most preferred melt viscosity at 180° C. is approximately 1500 cps.

Typical industrial applications include packaging, particularly for low temperature use such as for dairy products or for freezer packaging of food products, and in sanitary disposable consumer articles, for example, diapers, feminine care pads, napkins, etc. However, even more traditional end use applications such as book-binding, wood working and labeling will also benefit from both the low temperature flexibility, heat resistance and the efficiency of end use in automated means of applying the invention compositions to the various art-recognized substrates or adherends. In a preferred embodiment, the adhesive compositions of the present invention are hot melt adhesives. In another embodiment, other polyolefins, preferably isotactic polypropylenes, such as Achieve™ 3866G, commercially available from ExxonMobil Chemical Co., Baytown, Tex., can be used as blend components in the adhesive composition of the present invention.

The hot melt adhesive compositions may be applied to the desired substrate or adhered in any manner known in the art, particularly those methods used traditionally for packaging. Typically a coating head or nozzle, with associated equipment, for example those manufactured by Nordson Corporation, Duluth, Ga., are used. The compositions can be applied as fine lines, dots or spray coatings, in addition to other traditional forms as desired.

Catalysts

Suitable catalysts include bis metallocene complexes with the same or different cyclopentadienyl ligands capable of producing stereoregular propylene sequences (either isotactic or syndiotactic, preferably isotactic). The preferred metallocenes are those that are chiral and stereorigid so as to impart isotactic polypropylene sequences, which are well known to one skilled in the art Preferred transition metal compound components are described in detail in U.S. Pat. Nos. 5,145,819; 5,243,001; 5,239,022; 5,329,033; 5,296,434; 5,276,208; 5,672,668; 5,304,614 and 5,374,752; and EP 549 900 and 576 970 all of which are herein fully incorporated by reference.

Selection of metallocene compounds for use to make isotactic or syndiotactic polypropylene, and their syntheses, are well-known in the art, specific reference may be made to both patent literature and academic, see for example Journal of Organometallic Chemistry 369, 359–370 (1989). Typically those catalysts are stereorigid asymmetric, chiral or bridged chiral metallocenes. Either the rac- or meso-isomers can be used. Catalyst selection should lead to the same type of tacticity for each of the propylene-based polymer compounds. Preferred catalysts lead to isotactic polymers. See, for example, U.S. Pat. No. 4,892,851, U.S. Pat. No. 5,017,714, U.S. Pat. No. 5,296,434, U.S. Pat. No. 5,278,264, WO-A-(PCT/US92/10066) WO-A-93/19103, EP-A2-0 577 581, EP-A1-0 578 838, and academic literature "The Influence of Aromatic Substituents on the Polymerization Behavior of Bridged Zirconocene Catalysts", Spaleck, W., et al, Organometallics 1994, 13, 954–963, and "ansa-Zirconocene Polymerization Catalysts with Annelated Ring Ligands-Effects on Catalytic Activity and Polymer Chain Lengths", Brinzinger, H., et al, Organometallics 1994, 13, 964–970, and documents referred to therein.

Additional bridged metallocene compounds, particularly preferred for stereoregular copolymer catalysis include:

Dimethylsilandiylbis (2-methyl-4-phenyl-1-indenyl) Zirconium dimethyl

Dimethylsilandiylbis(2-methyl-4,5-benzoindenyl) Zirconium dimethyl;

Dimethylsilandiylbis(2-methyl-4,6-diisopropylindenyl) Zirconium dimethyl;

Dimethylsilandiylbis(2-ethyl-4-phenyl-1-indenyl) Zirconium dimethyl;

Dimethylsilandiylbis (2-ethyl-4-naphthyl-1-indenyl) Zirconium dimethyl,

Phenyl(methyl)silandiylbis(2-methyl-4-phenyl-1-indenyl) Zirconium dimethyl,

Dimethylsilandiylbis(2-methyl-4-(1-naphthyl)-1-indenyl) Zirconium dimethyl,

Dimethylsilandiylbis(2-methyl-4-(2-naphthyl)-1-indenyl) Zirconium dimethyl,

Dimethylsilandiylbis(2-methyl-indenyl) Zirconium dimethyl,

Dimethylsilandiylbis(2-methyl-4,5-diisopropyl-1-indenyl) Zirconium dimethyl,

Dimethylsilandiylbis(2,4,6-trimethyl-l-indenyl) Zirconium dimethyl,

Phenyl(methyl)silandiylbis(2-methyl-4,6-diisopropyl-1-indenyl)Zirconium dimethyl, 1,2-Ethandiylbis(2-methyl-4,6-diisopropyl-1-indenyl) Zirconium dimethyl, 1,2-Butandiylbis(2-methyl-4,6-diisopropyl-1-indenyl) Zirconium dimethyl, Dimethylsilandiylbis(2-methyl-4-ethyl-1-indenyl) Zirconium dimethyl, Dimethylsilandiylbis(2-methyl-4-isopropyl-1-indenyl) Zirconium dimethyl, Dimethylsilandiylbis(2-methyl-4-t-butyl-1-indenyl) Zirconium dimethyl, Phenyl(methyl)silandiylbis(2-methyl-4-isopropyl-1-indenyl)Zirconium dimethyl, Dimethylsilandiylbis(2-ethyl-4-methyl-1-indenyl) Zirconium dimethyl, Dimethylsilandiylbis(2,4-dimethyl-1-indenyl) Zirconium dimethyl, Dimethylsilandiylbis(2-methyl-4-ethyl-1-indenyl) Zirconium dimethyl, Dimethylsilandiylbis(2-methyl-α-acenaphth-1-indenyl) Zirconium dimethyl, Phenyl(methyl)silandiylbis(2-methyl-4,5-benzo-1-indenyl) Zirconium dimethyl, Phenyl(methyl)silandiylbis(2-methyl-4,5-(methylbenzo)-1-indenyl)Zirconium dimethyl, Phenyl(methyl)silandiylbis(2-methyl-4,5-(tetramethylbenzo)-1-indenyl)Zirconium dimethyl, Phenyl(methyl)silandiylbis(2-methyl-a-acenaphth-1-indenyl)Zirconium dimethyl, 1,2-Ethandiylbis(2-methyl-4,5-benzo-1-indenyl) Zirconium dimethyl, 1,2-Butandiylbis(2-methyl-4,5-benzo-1-indenyl) Zirconium dimethyl, Dimethylsilandiylbis(2-methyl-4,5-benzo-1-indenyl) Zirconium dimethyl, 1,2-Ethandiylbis(2,4,7-trimethyl-1-indenyl) Zirconium dimethyl, Dimethylsilandiylbis(2-methyl-1-indenyl) Zirconium dimethyl, 1,2-Ethandiylbis(2-methyl-1-indenyl) Zirconium dimethyl, Phenyl(methyl)silandiylbis(2-methyl-1-indenyl) Zirconium dimethyl, Diphenylsilandiylbis(2-methyl-1-indenyl) Zirconium dimethyl, 1,2-Butandiylbis(2-methyl-1-indenyl) Zirconium dimethyl, Dimethylsilandiylbis(2-ethyl-1-indenyl) Zirconium dimethyl, Dimethylsilandiylbis(2-methyl-5-isobutyl-1-indenyl) Zirconium dimethyl, Phenyl(methyl)silandiylbis(2-methyl-5-isobutyl-1-indenyl) Zirconium dimethyl, Dimethylsilandiylbis(2-methyl-5-t-butyl-1-indenyl) Zirconium dimethyl, Dimethylsilandiylbis(2,5,6-trimethyl-1-indenyl) Zirconium dimethyl, Dimethylsilandiylbis (2-methyl-4-phenyl-1-indenyl) Zirconium dichloride Dimethylsilandiylbis(2-methyl-4,5-benzoindenyl) Zirconium dichloride, Dimethylsilandiylbis(2-methyl-4,6-diisopropylindenyl) Zirconium dichloride, Dimethylsilandiylbis(2-ethyl-4-phenyl-1-indenyl) Zirconium dichloride, Dimethylsilandiylbis (2-ethyl-4-naphthyl-1-indenyl) Zirconium dichloride, Phenyl(methyl)silandiylbis(2-methyl-4-phenyl-1-indenyl) Zirconium dichloride, Dimethylsilandiylbis(2-methyl-4-(1-naphthyl)-1-indenyl) Zirconium dichloride, Dimethylsilandiylbis(2-methyl-4-(2-naphthyl)-1-indenyl) Zirconium dichloride, Dimethylsilandiylbis(2-methyl-indenyl) Zirconium dichloride, Dimethylsilandiylbis(2-methyl-4,5-diisopropyl-1-indenyl) Zirconium dichloride, Dimethylsilandiylbis(2,4,6-trimethyl-1-indenyl) Zirconium dichloride, Phenyl(methyl)silandiylbis(2-methyl-4,6-diisopropyl-1-indenyl) Zirconium dichloride, 1,2-Ethandiylbis(2-methyl-4,6-diisopropyl-1-indenyl) Zirconium dichloride, 1,2-Butandiylbis(2-methyl-4,6-diisopropyl-1-indenyl) Zirconium dichloride, Dimethylsilandiylbis(2-methyl-4-ethyl-1-indenyl) Zirconium dichloride, Dimethylsilandiylbis(2-methyl-4-isopropyl-1-indenyl) Zirconium dichloride, Dimethylsilandiylbis(2-methyl-4-t-butyl-1-indenyl) Zirconium dichloride, Phenyl(methyl)silandiylbis(2-methyl-4-isopropyl-1-indenyl) Zirconium dichloride, Dimethylsilandiylbis(2-ethyl-4-methyl-1-indenyl) Zirconium dichloride, Dimethylsilandiylbis(2,4-dimethyl-1-indenyl) Zirconium dichloride, Dimethylsilandiylbis(2-methyl-4-ethyl-1-indenyl) Zirconium dichloride, Dimethylsilandiylbis(2-methyl-a-acenaphth-1-indenyl) Zirconium dichloride, Phenyl(methyl)silandiylbis(2-methyl-4,5-benzo-1-indenyl) Zirconium dichloride, Phenyl(methyl)silandiylbis(2-methyl-4,5-(methylbenzo)-1-indenyl) Zirconium dichloride, Phenyl(methyl)silandiylbis(2-methyl-4,5-(tetramethylbenzo)-1-indenyl) Zirconium dichloride, Phenyl(methyl)silandiylbis (2-methyl-a-acenaphth-1-indenyl) Zirconium dichloride, 1,2-Ethandiylbis(2-methyl-4,5-benzo-1-indenyl) Zirconium dichloride, 1,2-Butandiylbis(2-methyl-4,5-benzo-1-indenyl) Zirconium dichloride, Dimethylsilandiylbis(2-methyl-4,5-benzo-1-indenyl) Zirconium dichloride, 1,2-Ethandiylbis(2,4,7-trimethyl-1-indenyl) Zirconium dichloride, Dimethylsilandiylbis(2-methyl-1-indenyl) Zirconium dichloride, 1,2-Ethandiylbis(2-methyl-1-indenyl) Zirconium dichloride, Phenyl(methyl)silandiylbis(2-methyl-1-indenyl) Zirconium dichloride, Diphenylsilandiylbis(2-methyl-1-indenyl) Zirconium dichloride, 1,2-Butandiylbis(2-methyl-1-indenyl) Zirconium dichloride, Dimethylsilandiylbis(2-ethyl-1-indenyl) Zirconium dichloride, Dimethylsilandiylbis(2-methyl-5-isobutyl-1-indenyl) Zirconium dichloride, Phenyl(methyl)silandiylbis(2-methyl-5-isobutyl-1-indenyl) Zirconium dichloride, Dimethylsilandiylbis(2-methyl-5-t-butyl-1-indenyl) Zirconium dichloride, Dimethylsilandiylbis(2,5,6-trimethyl-1-indenyl) Zirconium dichloride, and the like, particularly the structurally similar hafnium compounds.

Additionally, metallocenes such as those described in U.S. Pat. No. 5,510,502, U.S. Pat. No. 4,931,417, U.S. Pat. No. 5,532,396, U.S. Pat. No. 5,543,373, WO 98/014585, EP611 773 and WO 98/22486 (each fully incorporated herein by reference) are suitable for use in this invention.

Co-Catalysts

For the purposes of this patent specification and appended claims, the terms "cocatalysts" and "activators" are used interchangeably and are defined to be any compound or component which can activate a metallocene compound, as defined above. For example, a Lewis acid, a non-coordinating ionic activator, an ionizing activator, or any other compound that can convert a metallocene catalyst precursor to a catalytically active metallocene cation is an activator or cocatalyst.

It is within the scope of this invention to use, as an activator for one or more metallocenes, alumoxane and/or to also use ionizing activators, neutral or ionic, such as tri(n-butyl)ammonium tetrakis(pentafluorophenyl) borate, dimethyl anilinium tetrakis(pentafluorophenyl) borate, trityl tetrakis(pentafluorophenyl) borate, or a trisperfluorophenyl boron metalloid precursor which ionize the neutral metallocene compound. Dimethylanilinium tetrakis(pentafluorophenyl)borate is a particularly preferred activator for the above named metallocenes. Generally, flouroaryl boron and aluminum compounds as neutral Lewis acids or as ionic salts comprising cations capable of protonating or abstracting an alkyl metallocene ligand will be suitable. Additional non-coordinating anions that may be useful in the present application may include but are not limited to those disclosed in U.S. Pat. Nos. 5,198,401, 5,296,433, 5,278,119, 5,407,884, EP 0 426 637, EP 0 500 944, EP 0 520 732, WO 95/24268, and WO 97/29845.

The metallocene can be used with a cocatalyst which may be alumoxane preferably methylalumoxane having an average degree of oligomerization of from 4 to 30 as determined by vapor pressure osmometry. Alumoxane may be modified to provide solubility in linear alkanes but is generally used from a toluene solution. Such solutions may include unreacted trialkylaluminum and the alumoxane concentration is generally indicated on Mol Al per liter, which figure includes any trialkyl aluminum which has not reacted to form an oligimer. The alumoxane, when used as cocatalyst, is generally used in molar excess, at a mol ratio of from 50 to 1000, preferably from about 100 to about 500.

There are a variety of methods for preparing alumoxane and modified alumoxanes, non-limiting examples of which are described in U.S. Pat. Nos. 4,665,208, 4,952,540, 5,091,352, 5,206,199, 5,204,419, 4,874,734, 4,924,018, 4,908,463, 4,968,827, 5,308,815, 5,329,032, 5,248,801, 5,235,081, 5,157,137, 5,103,031, 5,391,793, 5,391,529 and EP-A-0 561 476, EP-B1-0 279 586, EP-A-0 594-218 and WO 94/10180, all of which are fully incorporated herein by reference.

Scavengers

When using the catalysts of the invention, the total catalyst system will generally additionally comprise one or more organometallic compound. Such compounds as used in this application is meant to include those compounds effective for removing polar impurities from the reaction environment and for increasing catalyst activity. Impurities can be inadvertently introduced with any of the polymerization reaction components, particularly with solvent, monomer and catalyst feed, and adversely affect catalyst activity and stability. It can result in decreasing or even elimination of catalytic activity, particularly when ionizing anion precursors activate the catalyst system. The polar impurities, or catalyst poisons include water, oxygen, metal impurities, etc. Preferably steps are taken before provision of such into the reaction vessel, for example by chemical treatment or careful separation techniques after or during the synthesis or preparation of the various components, but some minor amounts of organometallic compound will still normally be used in the polymerization process itself.

Typically these compounds will be organometallic compounds such as the Group-13 organometallic compounds of U.S. Pat. Nos. 5,153,157, 5,241,025 and WO-A-91/09882, WO-A-94/03506, WO-A-93/14132, and that of WO 95/07941. Exemplary compounds include triethyl aluminum, triethyl borane, triisobutyl aluminum, methylalumoxane, and isobutyl aluminumoxane. Those compounds having bulky or $C_6$–$C_{20}$ linear hydrocarbyl substituents covalently bound to the metal or metalloid center being preferred to minimize adverse interaction with the active catalyst. Examples include triethylaluminum, but more preferably, bulky compounds such as triisobutylaluminum, triisoprenylaluminum, and long-chain linear alkyl-substituted aluminum compounds, such as tri-n-hexylaluminum, tri-n-octylaluminum, or tri-n-dodecylaluminum. When alumoxane is used as activator, any excess over the amount needed to activate the catalysts present can act as a poison scavenger compound and additional organometallic compounds may not be necessary. Alumoxanes also may be used in scavenging amounts with other means of activation, e.g., methylalumoxane and triisobutyl-aluminoxane with aryl boron or aryl aluminum activators. The amount of such compounds to be used with catalyst compounds of the inventions is minimized during polymerization reactions to that amount effective to enhance activity (and with that amount necessary for activation of the catalyst compounds if used in a dual role) since excess amounts may act as catalyst poisons.

Solvents

Aliphatic, cycloalphatic, and aromatic hydrocarbons may be used as solvents during the polymerization process. Preferred solvents are $C_{12}$ or lower straight-chain or branched-chain, saturated hydrocarbons, and $C_5$ to $C_9$ saturated alicyclic or aromatic hydrocarbons. Examples of such solvents or reaction media are hexanes, butane, pentane, heptane, cyclopentane, cyclohexane, cycloheptane, methyl cyclopentane, methyl cyclohexane, isooctane, benzene, toluene, xylene and mixtures thereof. In addition, one or more -olefins, either alone or admixed with other media, may serve as the reaction media, at selected concentrations of such olefins. A mixture of hexanes is most preferred.

Polymerization Processes

A typical polymerization process consists of a polymerization in the presence of a catalyst comprising a chiral metal compound and either 1) a non-coordinating compatible anion activator, or 2) an alumoxane activator. According to one embodiment of the invention, this comprises the steps of contacting ethylene and propylene with a catalyst in a suitable polymerization diluent, said catalyst comprising, for example, according to a preferred embodiment, a chiral metallocene catalyst, e.g., a bis (cyclopentadienyl) metal compound, and an activator. As noted above, the activator used may be an alumoxane activator or a non-coordination compatible anion activator. The alumoxane activator is preferably utilized in an amount to provide a molar aluminum to metallocene ratio of from about 1:1 to about 20,000:1 or more. The non-coordinating compatible anion activator is preferably utilized in an amount to provide a molar ratio of biscyclopentadienyl metal compound to non-coordinating anion of 10:1 to about 1:1. The above polymerization reaction is conducted by reacting such monomers in the presence of such catalyst system at a temperature of from about −100° C. to about 300° C. for a time of from about 1 second to about 10 hours to produce a copolymer having a weight average molecular weight of from about 5,000 or less to about 1,000,000 or more and a molecular weight distribution of from about 1.8 to about 4.5.

While the process of the present invention includes utilizing a catalyst system in the liquid phase (slurry, solution, suspension or bulk phase or combination thereof), according to other embodiments, high-pressure fluid phase or gas phase polymerization may also be utilized. When utilized in a gas phase, slurry phase or suspension phase polymerization, the catalyst systems will preferably be supported catalyst systems. See, for example, U.S. Pat. Nos. 5,057,475 and 5,643,847, incorporated herein by reference for purposes of U.S. practice. Such catalyst systems can also include other well-known additives such as, for example, scavengers. See, for example, U.S. Pat. No. 5,153,157, which is incorporated herein by reference for purposes of U.S. practices. These processes may be employed without limitation of the type of reaction vessels.

As stated above, and while it is also true for systems utilizing a supported catalyst system, the liquid phase process comprises the steps of contacting ethylene and propylene with the catalyst system in a suitable polymerization diluent and reacting the monomers in the presence of the catalyst system for a time and at a temperature sufficient to produce an ethylene-propylene copolymer of the desired molecular weight and composition.

According to one embodiment of the invention, the polymerization process comprises (a) reacting by contacting of propylene and at least one comonomer selected from the group consisting of ethylene and at least one $C_4$ to $C_{20}$ α-olefin, under suitable polymerization conditions, preferably solution polymerization conditions, in the presence of a suitable catalyst, such as metallocene, in at least one first reactor. The metallocene catalyst must be capable of incorporating the propylene sequences into isotactic or syndiotactic orientations. Suitable polymerization conditions are more fully exemplified in the following examples. A preferred solvent is hexane. The polymerization produces a copolymer having greater than 65 mol % propylene wherein at least a portion, preferably 40 mol %, of the propylene sequences are in isotactic or syndiotactic orientations.

Further, one may (b) optionally, in at least a second or subsequent reactors, polymerize of propylene and at least one comonomer selected from the group consisting of ethylene and at least one $C_4$ to $C_{20}$ α-olefin, under suitable polymerization conditions, preferably solution polymerization conditions, in the presence of a metallocene catalyst. Although the solvent and monomers can be fed to each reactor, preferably the catalyst is fed to the first reactor only. The polymerization in the second reactor may duplicate the polymerization in the first reactor, that is, produce a copolymer that is approximately greater than 65 mol % propylene wherein at least a portion, preferably 40 mol % of the propylene sequences are in isotactic or syndiotactic orientations.

The solutions of the first reactor preferably are combined with the solutions of the subsequent reactors to form a solution containing a blend of polymers. The solvent is then preferably removed from the solution of the blend and the blend is recovered, and optionally, a tackifier may be added into the first reactor of step (a), the second or subsequent reactors of step (b), or at any point subsequent to the reactor in step (b).

Series reactor or parallel reactor operation can be used to increase the crystallinity without increasing the brittleness of the adhesive by making copolymers with higher propylene content in one reactor (and thus having a higher melt temperature which provides a higher use temperature) and then making a copolymer with lower propylene content in the other reactor (and thus being more amorphous which provides greater tack, softness, and better low temperature properties). Combined they make a better hot melt adhesive.

In general, the propylene based copolymers of the present invention preferably have a narrow molecular weight distribution for single sited metallocene catalyst products. However, the blends resulting from series or parallel reactor operations as described herein provide tailored molecular weight distributions by choosing suitable conditions, as will be described in detail in the following examples, such that different molecular weight polymers are made in each reactor, resulting in bimodal or multimodal blends.

Reactor Operations (General)

One or more stirred tank reactors in series or in parallel may be used in the present invention. The reactor operation is a solution copolymerization using the suitable described catalysts. Catalyst and activator may be delivered as a solution or slurry, either separately to the reactor (in-situ), activated in-line just prior to the reactor, or preactivated and pumped as an activated solution or slurry to the reactor. The preferred operation is two solutions activated in-line.

Polymerizations are carried out in either single reactor operation, in which solvent, monomer, comonomers, catalyst/activator, scavenger, and optional modifiers are added continuously to a single stirred tank or in series reactor operation, in which the above components (except for the catalyst) are added to each of two or more reactors connected in series and said monomers are allowed to react for a sufficient time to produce the invention copolymers. The catalyst component must be added to the first reactor in the series. The catalyst component may also be added to both reactors, but preferably, is added only to the first reactor.

Generally speaking the polymerization reaction temperature can vary from about 40° C. to about 250° C. Preferably the polymerization reaction temperature will be from 60° C. to 220° C. The pressure can vary from about 1 mm Hg to 2500 bar, preferably from 0.1 bar to 1600 bar, most preferably from 1.0 to 500 bar.

The process can be carried out in a continuous stirred tank reactor, or more than one operated in series or parallel. These reactors may have or may not have internal cooling and the monomer feed my or may not be refrigerated. See the general disclosure of U.S. Pat. No. 5,001,205 for general process conditions. See also, international application WO 96/33227 and WO 97/22639. All documents are incorporated by reference for description of polymerization processes, metallocene selection and useful scavenging compounds.

In one preferred process, all feeds are pumped into the reactors by metering pumps except for the ethylene (and hydrogen where applicable) which flow as a gas under its own pressure through a mass flow meter/controller. In an alternative process, monomer may be added to the reactor by a preformed solution. The polymer composition may be controlled by adjustment of the ethylene head pressure over the feed solution.

Temperature control in the reactor is obtained by balancing the heat of polymerization and with reactor cooling by reactor jackets or cooling coils to cool the contents of the reactor, auto refrigeration, prechilled feeds or combinations of all three. Adiabatic reactors with prechilled feeds are preferred. The reactor temperature depends on the catalyst used. In general, the reactor temperature preferably can vary between about 0° C. and about 160° C., more preferably from about 10° C. to about 140° C., and most preferably from about 40° C. to about 120° C. In series operation, the second reactor temperature is preferably higher than the first reactor temperature. In parallel reactor operation, the temperatures of the two reactors are independent.

The polymer composition is preferably controlled by the amount of monomers fed to each reactor of the series. In a single reactor series, unreacted monomers are flashed off in the polymer workup. In a two reactor series, unreacted monomers from the first reactor flow into the second reactor and so the monomers added to the second reactor are just enough to adjust the composition of the feed to the desired level, taking into account the monomer carry over.

The molecular weight of the polymer is controlled by the reactor temperature and by the addition of chain transfer agents such as hydrogen. With metallocene catalysts, polymer molecular weight generally declines with increasing reaction temperature and increasing transfer agents. In a two reactor series for adiabatic reactor operation with a higher temperature in the second reactor, it is easier to make the low molecular weight component in the second reactor. Molecular weight in the second reactor can be further reduced and the molecular weight distribution (MWD) of the subsequent blend may be broadened by adding hydrogen to the second reactor. Hydrogen can also be added to the first reactor but because unreacted hydrogen will carry over to the second reactor the molecular weight of both polymer components will be decreased in this situation and the effect of hydrogen on MWD will be much less. In parallel reactor operation the monomer, comonomer, catalyst, hydrogen, scavenger, solvent and other feeds are all treated independently.

Single Reactor Polymerization Processes

Polymerizations are carried out in a single, stirred reactor with continuous flow of feeds to the system and continuous withdrawal of products. In certain examples a one-liter stirred reactor was used. Solvent, including but not limited to hexane, and monomers including but not limited to, propylene and ethylene are preferably purified using filtering membranes or mechanical devices, preferably beds of alumina and mole sieves. The solvent for preparing catalyst solutions may also be purified by the same technique.

The reactor temperature is preferably controlled by circulating steam/water through a reactor jacket. The reactors are maintained at a pressure in excess of the vapor pressure of the reactant mixture to keep the reactants in the liquid phase. The reactors are operated liquid full. Propylene and ethylene feeds are mixed with a hexane stream that has been cooled, preferably from about 0° C. to about −50° C. Alternatively, if ENB (ethylidene norbornene) is used, it is also fed into the hexane stream upstream of the other monomers. A hexane solution of triisobutyl aluminum scavenger is added to the combined solvent and monomer stream preferably just before it enters the reactor to further reduce the concentration of any catalyst poisons. The catalyst components in the solvent, preferably toluene or toluene/hexane mixtures, are either preactivated in one solution and pumped together or dissolved as two single component solutions and pumped separately to the reactor. Preferably, in most cases, the catalyst is activated in-line just prior to the reactor. The activated catalyst enters the reactor through a separate port outfitted with a dip tube to ensure adequate distribution. The polymer/solvent/unconverted monomers, and catalyst solution exit the reactor through a pressure control valve that reduces the pressure of the polymerization process to atmospheric pressure. The reduction to atmospheric pressure causes the unconverted monomers in the solution to flash into a vapor phase that is preferably vented from the top of a vapor-liquid separator. The liquid phase, including, for the most part, polymer and solvent, flows out the bottom of the separator and is collected for polymer recovery. After removing a small portion of the polymer for determining polymer concentration, a stabilizer is preferably added to the polymer solution. The stabilized polymer is recovered from the solution by either steam stripping, followed by vacuum drying, or by solvent evaporation over heat and vacuum drying.

Gel Permeation Chromatography (GPC) techniques that were used to characterize the products of this invention have been described in several publications notably U.S. Pat. No. 4,989,436 which is incorporated for purposes of U.S. patent practice. Molecular weight and composition measurements are described in G. Ver Strate, C. Cozewith, S. Ju, Macromolecules, 21, 3360 (1988) which is incorporated by reference for purposes of U.S. patent practice. The variety of other techniques used are soundly based in polymer structure characterization as described in "Structure Characterization" The Science and Technology of Elastomers, F. Eirich, editor, Academic Press 1978 Chapter 3 by G. Ver Strate.

The glass transition temperature Tg (ASTM E-1356-95), the melt temperature Tm (ASTM E-794-95), and heat of fusion (ASTM E-793-95) and crystallization are evaluated based on the measurements from the first melt and the quench. In some cases, low melting crystallinity will not be seen on the second scan as it may take many hours to develop even at low temperatures.

Samples of the polymer solution from the reactor were analyzed for polymer concentration. From this measurement and the reactor feed rates the polymerization rate (referred to as Poly Rate herein) could be determined by material balances. Monomer conversions were then calculated from the polymerization rate and polymer composition data.

Reactor conditions and feed rates are shown in Table 1. Table 2 compares the polymer properties and Table 3 compares the formulated adhesive compositions.

High MFR Adhesives

Certain embodiments of the invention involve high MFR adhesives, specifically, adhesive compositions that include a polymer or blend of polymers having an MFR greater than 250 dg/min of 230° C. The following discussion relates to the high MFR adhesive compositions, particularly those discussed below. However, certain specific embodiments of the invention include treating any one of the polymers or polymer blends described above with a free radical initiator, e.g., peroxide, to obtain an adhesive composition with an MFR greater than 250 dg/min.

A specific embodiment of this invention is directed to adhesive compositions having an MFR greater than about 250 dg/min. at 230° C., the composition including a random copolymer produced by copolymerizing propylene and at least one of ethylene or an alpha-olefin having 3 to 8 carbon atoms, the random copolymer having a crystallinity at least about 2% and no greater than about 65% derived from stereoregular polypropylene sequences and a melting point of from about 25° C. to about 105° C. It is understood that while the overall composition may include additional ingredients that may further increase the overall MFR of the composition, it is the MFR of the polymer or blend of polymers that is referred to herein, e.g., following treatment with a peroxide or other free radical initiator, which results in modification of the MFR of the polymer. Advantageously, therefore, additional treatment steps or MFR-increasing additives are not necessarily required. In a specific embodiment, the polymers having the high MFR are mixed with other additives, discussed below, and can be used directly as an adhesive, e.g., in sprayable form. The adhesives can be used in any number of manufactured articles, including those discussed above. Preferably, the adhesive compositions discussed herein, having a polymer or blend of polymers with high MFR are used in conventional "hot melt adhesive" applications.

Another specific embodiment is directed to an adhesive composition including the reaction product of a free radical initiator and a random copolymer produced by copolymerizing propylene and at least one of ethylene or an alpha-olefin having 20 or less carbon atoms, preferably 8 or less carbon atoms, the random copolymer having a crystallinity at least about 2% and no greater than about 65% derived from stereoregular polypropylene sequences and a melting point of from about 25° C. to about 105° C. Preferably, the reaction product, a modified polymer, has an MFR 250 or greater as discussed in greater detail elsewhere herein.

Any of the high MFR adhesives compositions described herein may additionally include any one or more of the additives discussed above, such as tackifiers, plasticizers (e.g., extender oils), waxes, colorants, antioxidants and other fillers that are conventionally used in adhesive compositions.

Another specific embodiment of the invention includes an adhesive composition formed by treating a polymer composition in the melted state with a free-radical initiator in an amount effective to increase the MFR at 230° C. by at least 100% Preferably, the copolymer is the product of a single step polymerization process and is an ethylene/propylene copolymer.

The free-radical initiator, e.g., peroxide, may be added to the polymer while the polymer is in a solid form, e.g., by coating polymer pellets with an initiator, such as peroxide, which may be in powder form, in which case the polymer is said to be "treated" with the initiator when the initiator becomes active, which usually happens at a temperature higher than melting point of the polymer. Preferably, however, the free-radical initiator is added to the polymer after the polymer has formed, but while the polymer is in a melted condition, e.g., during the post-polymerization processing, such as when a polymer mixture (which may include solvent) is introduced to a devolatalizer or extruder, which typically occurs at an elevated temperature. The term "melted" refers to the condition of the polymer when any portion of the polymer is melted, and includes both fully melted and partially melted. Preferably, the polymer is treated by the free-radical initiator while the temperature of the polymer is above its melting point.

In another specific embodiment, the free radical initiator used in an adhesive composition disclosed herein includes a peroxide. As but one example, the peroxide may be 2,5-bis(tert-butylperoxy)-2,5-dimethyl-hexane. Any other peroxide that promotes free radicals are also included within the definition of "peroxide." Alternatively, the free radical initiator may include a diazo compound, or any other compound that promotes free radicals in an amount sufficient to cause degradation as specified herein.

In a specific embodiment an adhesive composition identified above may be simultanously degraded through chain scission and crosslinked, wherein the extent of degradation through chain scission is greater than the extent of crosslinking. This is preferably accomplished by limiting the ethylene content in the polymer or polymer blend. It is recognized by the inventors that too much ethylene (or alpha olefin) causes the crosslinking to predominate, thus preventing chain scission and degradation. However, there is preferably sufficient ethylene to provide a melting point between 80 and 100 degrees C. Preferably, the ethylene or alpha olefin content is maintained below about 39 mole %.

Broadly, the adhesive compositions herein may have a molecular weight distribution between about 1.8 and 5.0. More narrowly, the adhesive compositions above may have a molecular weight distribution between about 2.0 and 3.2.

Preferably, the adhesive compositions herein may include ethylene or alpha-olefin with a narrow composition distribution. In a more specific embodiment, the composition distribution may be no greater than about 14 mole %. In any of the adhesive compositions above, the random copolymer may be produced by copolymerizing propylene and ethylene, wherein the composition distribution of ethylene is no greater than about 27 mole %.

In any of the adhesive compositions herein, the random copolymer may be a branched random copolymer. In a specific embodiment, more than about 50% of the molecules of the random copolymer may be branched molecules. In a more specific embodiment, more than about 80% of the molecules of the random copolymer may be branched molecules.

In a specific embodiment of the adhesive composition, the random copolymer includes from at least about 6 mole % to no greater than about 33 mole % ethylene units or alpha-olefin units having 8 or less carbon atoms.

In another specific embodiment, the random copolymer of the adhesive composition may include more than about 67 mole % by weight propylene units (e.g., C3/C2). More specifically, the random copolymer of the adhesive composition may include more than about 80% by weight propylene units.

In a specific embodiment, although the adhesive composition may have an MFR greater than about 250 dg/min. at 230° C., it may also have an MFR of at least about 350 dg/min. at 230° C. More narrowly, the adhesive composition may have an MFR of at least about 500 dg/min. at 230° C. In a specific embodiment of any of the adhesive compositions identified above, the free radical initiator used to form the reaction product may be in the amount of at least about 0.25 wt % and no greater than about 5.00 wt %, based on the weight of the random copolymer.

In yet another specific embodiment, the adhesive composition may include a polymer or polymer blend, e.g., a semi-crystalline propylene copolymer such as those described herein, with a melt index (MI) as measured by ASTM D 1238(B) of from about 3000 dg/min to about 7 dg/min, or from about 2500 to about 10 dg/min, or from about 2000 to about 15 dg/min, or from about 900 to about 20 dg/min, or from about 78 to about 630 dg/min. Preferably, the polymer or polymer or polymer blend has the above described MI ranges, either following formation of the polymer in a polymerization reaction as discussed above, or following degradation treatment, and preferably has those MI values without additional processing or use of additives.

For example, the free radical initiator used to form the reaction product may be in the amount of at least about 0.50 wt % and no greater than about 3.00 wt %, based on the weight of the random copolymer.

Alternatively, the free radical initiator used to form the reaction product may be in the amount of at least about 1.00 wt % and no greater than about 2.00 wt %, based on the weight of the random copolymer. The ranges of the amounts of free radical initiators may fall between any of the amounts identified any of the Examples below, e.g., between 0.33 wt % and 1.00 wt %.

Preferably, the adhesive composition of this invention is a blend that includes a crystalline polymer blended with the random copolymer. More specifically, the adhesive composition may be a blend that includes a crystalline polymer blended with the random copolymer, wherein the crystalline polymer has a melting point greater than at least about 110° C. More narrowly, the crystalline polymer may have a melting point greater than about 115° C. More specifically, the crystalline polymer may have a melting point greater than about 130° C.

In a specific embodiment, any of the adhesive compositions mentioned herein may be or include a blend that includes a crystalline polymer blended with the random copolymer, wherein the crystalline polymer includes polypropylene or a copolymer comprising propylene units and at least one comonomer selected from the group consisting of ethylene or C4-C12 alpha-olefins, the copolymer having a comonomer content of less than about 14 mole %.

In a specific version of the disclosed adhesive compositions, the comonomer content may range up to about 12 mole %. Preferably, the comonomer content may range from about 7 mole % to about 12 mole %. In a specific embodiment, the comonomer content is less than about 3 mole %.

In another specific embodiment, the propylene content of the random copolymers of any of the disclosed adhesive compositions may be between about 55 mole % or greater and about 93 mole % or less. More specifically, the propylene content of the random copolymer may be about 60 mole % or greater. More narrowly still, the propylene content of the random copolymer may be about 73 mole % or greater. Also, the upper limit of the random copolymer may be lower than 93 mole %. For example, in specific embodiments of this invention, the propylene content of the random copolymer is about 89 mole % or less. Alternatively, the propylene content of the random copolymer may be about 85 mole % or less. Additionally, the propylene content of the random copolymer may be about 84 mole % or less.

The crystalline polymer of any of the adhesive compositions identified herein may include isotactic polypropylene. The isotactic polypropylene may have a melting point greater than 110° C. Alternatively, the isotactic polypropylene may have a melting point greater than 115° C. More specifically, the isotactic polypropylene may have a melting point greater than 130° C.

As mentioned above, another aspect of this invention is directed to a process. A specific embodiment of this invention involves a process for making a degraded adhesive composition, including: (a) providing a first polymer composition having an MFR less than 250 dg/min. at 230° C. and comprising a random copolymer produced by copolymerizing propylene and at least one of ethylene or alpha-olefin having 4 to 20 carbon atoms, preferably 4 to 8 carbon atoms, the random copolymer having a crystallinity at least about 2% and no greater than about 65% derived from stereoregular polypropylene sequences and a melting point of from about 25° C. to about 105° C.; and (b) contacting the first polymer composition, in the melted state, with a free radical initiator, to provide a second polymer composition, where the second polymer composition has an MFR greater than 250 dg/min. at 230° C.

In any degradation process identified elsewhere herein, the first polymer composition may have an MFR less than 50 dg/min. at 230° C. prior to contacting the first polymer composition with the free radical initiator. In a specific embodiment of the process, the free radical initiator may include a peroxide. Specifically, the free radical initiator may include 2,5-bis(tert-butylperoxy)-2,5-dimethyl-hexane. Alternatively, the free radical initiator may include a diazo compound.

In any of the degradation processes disclosed herein, the first polymer composition may be both degraded through chain scission and crosslinked in the presence of the free radical initiator, wherein the extent of degradation through chain scission should be greater than the extent of crosslinking.

In any of the degradation processes disclosed herein, less than 50% of the molecules of the first polymer composition may be branched molecules prior to contact with the free radical initiator. Conversely, in any of the processes, more than 50% of the molecules of the second polymer composition may be branched molecules.

In one specific embodiment, a process disclosed herein includes adding a crystalline polymer to either the first or second polymer composition. In a specific embodiment, any of the processes may include either: (a) adding a crystalline polymer to form a blend with the random copolymer of the first polymer composition prior to contacting the first polymer composition with the free radical initiator; or (b) adding a crystalline polymer to form a blend with the random copolymer of the second polymer composition after forming the second polymer composition.

With respect to the processes disclosed herein, the first polymer composition or the second polymer composition, or both, may additionally include a crystalline polymer blended with the random copolymer, the crystalline polymer having a melting point greater than about 110° C. More narrowly, the crystalline polymer may have a melting point greater than about 115° C. Even more specifically, the crystalline polymer may have a melting point greater than about 130° C.

In a specific embodiment of the process, the first polymer composition or the second polymer composition, or both, may additionally include a crystalline polymer blended with the random copolymer, wherein the crystalline polymer comprises polypropylene or a copolymer comprising propylene units and at least one comonomer selected from the group consisting of ethylene or C4-C20 alpha-olefins, preferably the group consisting of ethylene or C4-C8 alpha-olefins, the copolymer having a comonomer content of less than about 14 mole %.

For example, the comonomer content may be up to about 11 mole % and more preferably from about 7 mole % to about 11 mole %. The comonomer content may be less than about 3 mole %. In a specific embodiment, the propylene content of the random copolymer may be about 63 mole % or greater and about 93 mole % or less. Within that range, for example, the propylene content of the random copolymer may be about 60 mole % or greater. More narrowly, within that range, the propylene content of the random copolymer may be about 73 mole % or greater. Also within the above-mentioned range, the propylene content of the random copolymer may be about 89 mole % or less. More narrowly, the propylene content of the random copolymer may be about 86 mole % or less. More narrowly still, the propylene content of the random copolymer may be about 83 mole % or less In any of the processes disclosed herein, the crystalline polymer may include isotactic polypropylene. The isotactic polypropylene may, for example, have a melting point greater than 110° C. More narrowly, isotactic polypropylene may have a melting point greater than 115° C. More narrowly still, the isotactic polypropylene having a melting point greater than 130° C.

Preferably, in any of the degradation processes disclosed herein, the first polymer composition is fully melted in the presence of the free radical initiator. When a free radical initiator is used, an effective amount of free radical initiator should be contacted with the first polymer composition. Preferably, the free radical initiator is present in an amount sufficient to increase the MFR of the first polymer composition. More preferably, the free radical initiator is present in an amount sufficient to increase the MFR of the first polymer composition by at least 100% to form the second polymer composition.

In certain specific embodiments of the degradation process, the first polymer composition has an MFR of less than 50 dg/min. at 230° C. In other specific embodiments, the first polymer composition has an MFR of less than 40 dg/min. at 230° C. In yet other specific embodiments, the first polymer composition has an MFR of less than 30 dg/min. at 230° C. In certain other embodiments of the degradation process, the first polymer composition has an MFR of less than 20 dg/min. at 230° C.

As mentioned above, the second polymer composition preferably has an MFR greater than 250 dg/min. at 230° C. As reflected in the examples below, however, with the present invention, the MFR can be higher than 250 dg/min. at 230° C., and for certain specific embodiments, the MFR may be greater than 350 dg/min. at 230° C. For example, the second polymer composition may have an MFR greater than 500 dg/min. at 230° C. For certain processes, the second polymer composition may have an MFR greater than 600 dg/min. at 230° C. For yet others, the second polymer composition has an MFR greater than 750 dg/min. at 230° C. In some circumstances, it is desirable for the second polymer composition to have an MFR greater than 1,000 dg/min. at 230° C.

Preferably, the crystallinity of the random copolymer is at least about 10%. In a specific embodiment, the crystallinity of the random copolymer is preferably no greater than about 40%. In a another specific embodiment, the crystallinity of the random copolymer is no greater than about 45%. In yet another specific embodiment, the crystallinity of the random copolymer is no greater than about 50%.

Certain terms and properties used in characterizing aspects of the high MFR composition will now be defined, as used in this patent and for purposes of interpreting the scope of the claims.

Semicrystalline Random Copolymer. In certain specific embodiments, the adhesive composition includes a "semicrystalline random copolymer." The term "random copolymer" as used herein is defined as a copolymer in which the distribution of the monomer residues is consistent with the random statistical polymerization of the monomers, and includes copolymers made from monomers in a single reactor, but does not include copolymers made from monomers in series reactors, which are defined herein to be "block copolymers." The random copolymer discussed herein is preferably "semicrystalline," meaning that in general it has a relatively low crystallinity, as will be discussed more specifically below. This semicrystalline random copolymer can include, for example, 70–88 mole % propylene units and alpha olefin units having 2 carbon atoms (ethylene units) or from 4 to 20 carbon atoms, preferably from 4 to 8 carbon atoms, e.g., butene units or octene units. In a specific embodiment, a semicrystalline random copolymer useful herein is a polypropylene polymer, specifically a propylene-ethylene copolymer, in which a substantial number of the copolymer units are propylene units, e.g., greater than 70 mole %, including such copolymers having 85–90 mole % propylene, or copolymers having 70–88 mole % propylene. That semicrystalline random copolymer is thus distinguishable from copolymers made of propylene and ethylene units that have fewer than 70 mole % propylene units, including conventional polyethylene polymers having some amount of propylene. It has been discovered that superior adhesive properties can be obtained using one or more of the semicrystalline random copolymers described herein.

The random copolymers may be substantially amorphous, but should be crystallizable and should have a crystallinity of at least about 2% and no greater than about 65%. The crystallinity of the random copolymer should be derived from stereoregular polypropylene sequences. The random copolymer may be crystallizable, meaning that they may be amorphous in an undeformed state, but upon stretching or annealing, crystallization may occur. In any event, the melting point of the random copolymer should be from about 25° C. to about 105° C., and preferably less than 100° C. Further, the heat of fusion of the random copolymer should be less than 75 J/g as determined by DSC. A variety of comonomers may be used in forming the random copolymers described herein. Suitable comonomers include ethylene and alpha-olefins, such as $C_4$–$C_{20}$ alpha-olefins and preferably $C_4$–$C_8$ alpha-olefins. The alpha-olefin comonomer can be linear or branched, and two or more comonomers can be used, if desired. Examples of suitable comonomers include ethylene, linear $C_4$–$C_8$ alpha-olefins, and alpha-olefins having one or more $C_1$–$C_3$ alkyl branches. Specific examples include ethylene; 3-methyl-1-butene; 3,3-dimethyl-1-butene; 1-pentene; 1-pentene with one or more methyl, ethyl or propyl substituents; 1-hexene with one or more methyl, ethyl or propyl substituents; 1-heptene with one or more methyl, ethyl or propyl substituents; 1-octene with one or more methyl, ethyl or propyl substituents; 1-nonene with one or more methyl, ethyl or propyl substituents; ethyl, methyl or dimethyl-substituted 1-decene, or 1-dodecene. Preferred comonomers include ethylene, 1-butene, 1-pentene, 3-methyl-1-butene, 1-hexene, 3-methyl-1-pentene, 4-methyl-1-pentene, 3,3-dimethyl-1-butene, 1-heptene, 1-hexene with a methyl substituent on any of $C_3$–$C_5$, 1-pentene with two methyl substituents in any stoichiometrically acceptable combination on $C_3$ or $C_4$, 3-ethyl-1-pentene, 1-octene, 1-pentene with a methyl substituent on any of $C_3$ or $C_4$, 1-hexene with two methyl substituents in any stoichiometrically acceptable combination on $C_3$–$C_5$, 1-pentene with three methyl substituents in any stoichiometrically acceptable combination on $C_3$ or $C_4$, 1-hexene with an ethyl substituent on $C_3$ or $C_4$, 1-pentene with an ethyl substituent on $C_3$ and a methyl substituent in a stoichiometrically acceptable position on $C_3$ or $C_4$, 1-decene, 1-nonene, 1-nonene with a methyl substituent on any of $C_3$–$C_9$, 1-octene with two methyl substituents in any stoichiometrically acceptable combination on $C_3$–$C_7$, 1-heptene with three methyl substituents in any stoichiometrically acceptable combination on $C_3$–$C_6$, 1-octene with an ethyl substituent on any of $C_3$–$C_7$, 1-hexene with two ethyl substituents in any stoichiometrically acceptable combination on $C_3$ or $C_4$, and 1-dodecene. It should be appreciated that the list of comonomers above is merely exemplary, and is not intended to be limiting. A particularly preferred comonomer is ethylene.

Crystallinity. Another property that can be used to characterize the semicrystalline random copolymer is its crystallinity, which as discussed above is relatively low. As discussed below, the semicrystalline random copolymer used in specific embodiments of this invention preferably has a crystallinity of from 2% to 65% of the crystallinity of isotatic polypropylene. Without being bound by theory, it is contemplated that the relatively low crystallinity of the random copolymer provides The term "crystalline" as used herein broadly characterizes those polymers that possess a high degree of both inter and intra molecular order, and which preferably melt higher than 110° C., more preferably higher than 115° C., and most preferably above 130° C. A polymer possessing a high inter and intra molecular order is said to have a "high" level of crystallinity, while a polymer possessing a low inter and intra molecular order is said to have a "low" level of crystallinity. Crystallinity of a polymer can be expressed quantitatively, e.g., in terms of percent crystallinity, usually with respect to some reference or benchmark crystallinity. As used herein, crystallinity is measured with respect to isotactic polypropylene homopolymer. Preferably, heat of fusion is used to determine crystallinity. Thus, for example, assuming the heat of fusion for a highly crystalline polypropylene homopolymer is 190 J/g, a semicrystalline random copolymer having a heat of fusion of 95 J/g will have a crystallinity of 50%. The term "crystallizable" as used herein refers to those polymers or sequences that are mainly amorphous in the undeformed state, but upon stretching or annealing, become crystalline. Thus, in certain specific embodiments, the semicrystalline random copolymer can be crystallizable.

Polypropylene. The crystalline polymer is preferably a polypropylene polymer, wherein "polypropylene" is defined according to its conventional meaning. The polypropylene disclosed herein may be a homopolymer, in which the polymer is made up entirely of propylene sequences (also referred to interchangeably as "segments" or "units"). A propylene may also be a copolymer. For example, a polypropylene copolymer may be prepared by polymerizing propylene with a $C_2$ or $C_4$–$C_{20}$ alpha olefin, preferably by reacting propylene and ethylene in the presence of a chiral metallocene catalyst with an activator and optional scavenger. The comonomer used with propylene may be linear or branched. Preferred linear alpha-olefins include ethylene or $C_4$ to $C_{20}$ alpha olefins and preferably $C_4$ to $C_8$ alpha olefins, more preferably ethylene, 1-butene, 1-hexene, and 1-octene. Preferred branched alpha-olefins include 4-methyl-1-pentene, 3-methyl-1-pentene, and 3,5,5-trimethyl-1-hexene.

Preferred polypropylene copolymers have an average propylene content on a molar basis of from about 70 mole % to about 98 mole %, more preferably from about 85 mole % to about 97 mole %, most preferably from about 90 mole % to about 96 mole %. The balance of the copolymer is one or more alpha-olefins as specified above and optionally minor amounts of one or more diene monomers.

Preferably, the polypropylene copolymer comprises ethylene as the comonomer in the range of from about about 2 to 30 mole %, more preferably from about 3 to about 15 mole % ethylene, and most preferably from about 4 to 10 mole % ethylene.

The use of a chiral metallocene catalyst ensures that the methyl group of the propylene residues have predominantly the same tacticity. Both syndiotactic and isotactic configuration of the propylene are possible though the isotactic polymers are preferred. The tacticity of the propylene residues leads to crystallinity in the polymers. For the polymers of the present invention the low levels of crystallinity in the polypropylene copolymer are derived from isotactic polypropylene obtained by incorporating alpha-olefin comonomers as described above. The semi-crystalline polypropylene copolymer preferably has a heat of fusion from about 30 J/g to about 80 J/g, more preferably from about 40 J/g to about 70 J/g, and most preferably from about 50 J/g to about 65 J/g. The crystallinity of the polypropylene copolymer arises predominantly from crystallizable stereoregular propylene sequences. The crystallinity of the polypropylene copolymer can also be expressed in terms of percentage of crystallinity. For example, to the extent the thermal energy for the highest order of polypropylene is 190 J/g, 100% crystallinity would be equal to 190 J/g. Accordingly, the aforementioned heat of fusion values would provide a polypropylene crystallinity of from about 10% to about 45%, more preferably from about 20% to about 40%, and most preferably from about 25% to about 35%.

The polypropylene copolymer preferably has a single broad melting transition. Typically a sample of the polypropylene copolymer will show secondary melting peaks adjacent to the principal peak, these are considered together as a single melting point. The highest of these peaks is considered the melting point. The polypropylene copolymer preferably has a melting point of from about 25° C. to about 120° C., preferably in the range of from about 30° C. to about 110° C., more preferably in the range of from about 65° C. to about 100° C.

The weight average molecular weight of the polypropylene copolymer can be between 5,000 to 200,000 Daltons, preferably 50,000 to 150,000, with a MWD ($M_w/M_n$) between 1.5 to 40.0, more preferably between about 1.8 to 5 and most preferably between 1.8 to 3.

The length and distribution of stereoregular propylene sequences in preferred polypropylene copolymers is consistent with substantially random statistical copolymerization. It is well known that sequence length and distribution are related to the copolymerization reactivity ratios. By substantially random, we mean copolymer for which the product of the reactivity ratios is generally 2 or less. In stereoblock structures, the average length of polypropylene sequences is greater than that of substantially random copolymers with a similar composition. Prior art polymers with stereoblock structure have a distribution of polypropylene sequences consistent with these blocky structures rather than a random substantially statistical distribution. To produce a crystallizable copolymer with the required randomness and narrow composition distribution, it is desirable to use (1) a single sited catalyst and (2) a well-mixed, continuous flow stirred tank polymerization reactor which allows only a single polymerization environment for substantially all of the polymer chains of preferred polypropylene copolymers.

Preferred polypropylene copolymers of this embodiment are prepared by polymerizing propylene and at least one $C_2$ or $C_4$–$C_{20}$ alpha olefin in the presence of a chiral metallocene catalyst with an activator and optional scavenger. Preferred chiral metallocenes are those known to favor incorporation of propylene for the production of predominantly isotactic polypropylene pentads and statistically random incorporation of the α-olefin comonomer(s). The term "metallocene" and "metallocene catalyst precursor" are terms known in the art to mean compounds possessing a Group IV, V, or VI transition metal M, with a cyclopentadienyl (Cp) ligand or ligands which may be may be substituted, at least one non-cyclopentadienyl-derived ligand X, and zero or one heteroatom-containing ligand Y, the ligands being coordinated to M and corresponding in number to the valence thereof. The metallocene catalyst precursors generally require activation with a suitable co-catalyst (referred to as activator) in order to yield an active metallocene catalyst which refers generally to an organometallic complex with a vacant coordination site that can coordinate, insert, and polymerize olefins.

Preferable metallocenes are cyclopentadienyl (Cp) complexes which have two Cp ring systems for ligands. The Cp ligands preferably form a bent sandwich complex with the metal and are preferably locked into a rigid configuration through a bridging group. These cyclopentadienyl complexes have the general formula:

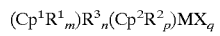

$$(Cp^1R^1{}_m)R^3{}_n(Cp^2R^2{}_p)MX_q$$

Wherein $Cp^1$ of ligand $(Cp^1R^1m)$ and $Cp^2$ of ligand $(Cp^2R^2{}_p)$ are preferably the same, $R^1$ and $R^2$ each is, independently, a halogen or a hydrocarbyl, halocarbyl, hydrocarbyl-substituted organometalloid or halocarbyl-substituted organometalloid group containing up to 20 carbon atoms, m is preferably 1 to 5, p is preferably 1 to 5, and preferably two $R^1$ and/or $R^2$ substituents on adjacent carbon atoms of the cyclopentadienyl ring associated there which can be joined together to form a ring containing from 4 to 20 carbon atoms, $R^3$ is a bridging group, n is the number of atoms in the direct chain between the two ligands and is preferably 1 to 8, most preferably 1 to 3, M is a transition metal having a valence of from 3 to 6, preferably from group 4, 5, or 6 of the periodic table of the elements and is preferably in its highest oxidation state, each X is a non-cyclopentadienyl ligand and is, independently, a hydrocarbyl, oxyhydrocarbyl, halocarbyl, hydrocarbyl-substituted organometalloid, oxyhydrocarbyl-substituted organometalloid or halocarbyl-substituted organometalloid group containing up to 20 carbon atoms, q is equal to the valence of M minus 2.

Numerous examples of the biscyclopentadienyl metallocenes described above for the invention are disclosed in U.S. Pat. Nos. 5,324,800; 5,198,401; 5,278,119; 5,387,568; 5,120,867; 5,017,714; 4,871,705; 4,542,199; 4,752,597; 5,132,262; 5,391,629; 5,243,001; 5,278,264; 5,296,434; and 5,304,614, all of which are incorporated by reference for purposes of U.S. patent practice.

Illustrative, but not limiting examples of preferred biscyclopentadienyl metallocenes of the type described in group 1 above for the invention are the racemic isomers of:

$\mu$-$(CH_3)_2$Si(indenyl)$_2$M(Cl)$_2$
$\mu$-$(CH_3)_2$Si(indenyl)$_2$M(CH$_3$)$_2$
$\mu$-$(CH_3)_2$Si(tetrahydroindenyl)$_2$M(Cl)$_2$
$\mu$-$(CH_3)_2$Si(tetrahydroindenyl)$_2$M(CH$_3$)$_2$
$\mu$-$(CH_3)_2$Si(indenyl)$_2$M(CH$_2$CH$_3$)$_2$
$\mu$-$(C_6H_5)_2$C(indenyl)$_2$M(CH$_3$)$_2$;

Wherein M is chosen from a group consisting of Zr, Hf, or Ti.

In another embodiment, the polymer component can be a blend of discrete polymers. Such blends can be of two or more polypropylene copolymers (e.g., as described above), where each of the components of the polymer blend would individually qualify as a polymer component.

It is understood in the context of the present invention that, in one or more embodiments, more than one polymer component may be used in a single blend. Each of the polymer components is described above and the number of polymer components in this embodiment is less than three and more preferably, two.

Adhesive Compositions. Preferably, the compositions of this invention are adhesive compositions. Preferably, the adhesive composition includes one or more additives, such as tackifiers, plasticizers (extender oils), waxes, colorants, antioxidants, fillers and others conventionally used in adhesive blends, which are discussed above. More preferably, the adhesive composition comprises from 0 to about 80 weight percent of at least one tackifier; from 0 to about 60 weight percent of at least one plasticizer; and from 0 to about 50 weight percent of at least one wax; from 0 to about 5 weight percent of an anti-oxidant, wherein the sum of the components (b), (c), and (d) comprises from about 5 to about 95 weight percent of said adhesive composition.

Suitable plasticizers or extender oils include aromatic, naphthenic, paraffinic, or hydrogenated (white) oils and mixtures thereof. One of the particular advantages of the invention is that none or only minor amounts of extender oils may be required to achieve good flow and coating characteristics because of the inherently low melt viscosity properties of the adhesive of the invention. Reduction in the level of extender oil required to process the composition tends to result in improved cohesiveness of the adhesive and reduces bleed out of the extender. Where used, the extender oil is added at a level from about 0.5 to about 25 parts by weight per hundred parts by weight of the SCP, more preferably from about 5 to 15 parts by weight.

As indicated above, the components forming the adhesive formulations of the invention have properties such that adhesives having a very low melt viscosity are provided, thereby facilitating flow of the adhesive through the coating apparatus, e.g., coating die, without resorting to the inclusion of solvents or excess extender oil into the composition. Melt viscosities of less than 10,000 centipoise measured at 180° C. per ASTM D 3236 can be readily achieved for the adhesive blend. The more preferred melt viscosity at 180° C. is less than 2,000 cps and the most preferred melt viscosity at 180° C. is approximately 1500 cps.

Typical industrial applications include packaging, particularly for low temperature use such as for dairy products or for freezer packaging of food products, and in sanitary disposable consumer articles, for example, diapers, feminine care pads, napkins, etc. However, even more traditional end use applications such as book-binding, wood working and labeling will also benefit from both the low temperature flexibility, heat resistance and the efficiency of end use in automated means of applying the invention compositions to the various art-recognized substrates or adherends. In a preferred embodiment, the adhesive compositions of the present invention are hot melt adhesives. In another embodiment, other polyolefins, preferably isotactic polypropylenes, such as Achieve™ 3866G, commercially available from ExxonMobil Chemical Co., Baytown, Tex., can be used as blend components in the adhesive composition of the present invention.

The hot melt adhesive compositions may be applied to the desired substrate or adhered in any manner known in the art, particularly those methods used traditionally for packaging. Typically a coating head or nozzle, with associated equipment, for example those manufactured by Nordson Corporation, Duluth, Ga., are used. The compositions can be applied as fine lines, dots or spray coatings, in addition to other traditional forms as desired.

Degradation. The term "degradation" as used herein refers to the process by which the melt flow rate of a material is increased, reflecting a lowering of molecular weight. Another term that is deemed to mean the same thing as "degraded" herein is "modified." Preferably, a free radical initiator is used to cause the increase in MFR. A polymer is modified or degraded in accordance with this invention when the polymer, or a blend of polymers, is treated with a free radical initiator, e.g., peroxide, preferably while the polymer is in a melted state, more preferably in a fully melted state. Preferably, the degradation of this invention involves controlled chain scission. For example, when a free radical initiator is used, free radicals of the polymers being treated are produced by thermal scission of the peroxide. Other sources of free radicals such as diazo compounds may also be utilized. In any case, it is contemplated that the free radicals produced from the initiator (e.g., peroxide) abstract the tertiary hydrogen on the propylene residue of the random copolymers. The resulting free radical disproportionates to two lower molecular weight chains, one with an olefin near the terminus and the other a saturated polymer. This process can continue with the generation of successively lower molecular weight polymers. Since the site of the attack and scission of the chains is random, the distribution of the molecular weight of the resulting degraded polymer approaches the most probable (PDI=2) irrespective of the PDI of the initial polymer, where "PDI" refers to Polydispersity Index, defined as Mw/Mn, where Mw and Mn are measured by GPC. Thus, under the appropriate conditions, chain scission is initiated to cause degradation of the polymer or polymer blend.

Another process that may occur during degradation, and that competes with chain scission, is crosslinking. In a crosslinking reaction, the free radicals combine to form branched macromolecules of higher molecular weight. Eventually, this synthesis reaction may lead to vulcanization of the polymer. In copolymers of ethylene and propylene, this balance of crosslinking and degradation is mainly dependent on the composition of the copolymer. Since the degradation reaction is uniquely associated with the propylene residues, lower amounts of propylene in the copolymer tend to favor crosslinking over degradation. However, it should be recognized that the scission and crosslinking reactions are not mutually exclusionary. That is, even during degradation, some amount of branching may occur. However, because the branching and scission reactions are random, these complementary processes should not lead to an increase in PDI. However, a polymeric material degraded as discussed herein preferably has a majority of branched molecules. The amount of branching depends on a number of variables, primarily the reaction conditions, the composition fo the polymers and the extent of degradation. Random copolymers having a higher ethylene content should generate a higher level of branching than those with a lower ethylene content. When the increase in MFR is small (factor of 2 or 3), then the extent of branching in the resulting polymer should be minor. However, when the extent of degradation of the polymer is relatively large (e.g., ratio of final to starting MFR is 20 or greater), then the amount of branching in the low molecular weight materials should be considerable. Thus, in certain embodiments of this invention, the rate or extent of degradation is to substantially proportional to the relative amounts of propylene and ethylene sites. For example, if too many ethylene sites are present, the use of the peroxide or other free radical initiator may result in crosslinking rather than chain scission, and the material being treated will not degrade to a higher MFR. Thus, an important aspect of certain specific embodiments of this invention relates to the relative amounts of the polymers used in the blend. It is recognized by the inventors that the random copolymer and a polypropylene degrade independently. It is contemplated that the polypropylene degrades faster than the random copolymer under similar conditions. Thus, a blend of random copolymer and polypropylene with change in PDI during the degradation procedure with the polypropylene degrading to a lower molecular weight sooner than the random copolymer.

Techniques for determining the molecular weight (Mn and Mw) and molecular weight distribution (MWD) are found in U.S. Pat. No. 4,540,753 (Cozewith, Ju and Verstrate) (which is incorporated by reference herein for purposes of U.S. practices) and references cited therein and in Macromolecules, 1988, volume 21, p 3360 (Verstrate et al) (which is herein incorporated by reference for purposes of U.S. practice) and references cited therein. Unless specifically identified, any one of those techniques may be used.

MFR (Melt Flow Rate) of the grafted and ungrafted material was measured according to ASTM D1238 condition 230/2.16.

Mooney viscosity of the grafted and ungrafted material was measured according to ASTM D1646, [ML(1+4), 125° C.].

EXAMPLES

The following examples are presented to illustrate aspects and features of specific embodiments of the invention. All parts, proportions and percentages are by weight unless otherwise indicated. Although the examples may be directed to certain embodiments of the present invention, they are not to be viewed as limiting the invention in any specific respect.

Example 1

Catalyst Activation. In this example, Catalyst A, $\mu$-Me$_2$Si (Indenyl)$_2$HfMe$_2$ (70.8 mg, 0.1430 mmole) (Cat. A) was preactivated with dimethylanilinium-tetrakis (pentafluorophenyl)borate [DMAH$^+$ B(pfp)4$^-$] (110.1 mg, 0.137 mmole) in toluene (900 mL) under an inert atmosphere. This mixture was allowed to activate until the evolution of methane stopped (5–10 min.) and then sealed for transfer to the delivery vessel. The catalyst solution was pumped to the reactor from the vessel at a controlled rate using a calibrated HPLC pump.

Copolymer Synthesis A mixture of hexanes (5.4 L/h) was pumped into a 1 liter, liquid filled, stirred tank reactor while the temperature was equilibrated at 50° C. using a steam/water mixture flowing through the reactor jacket. The preactivated Cat A in toluene (0.078 L/h, 0.0119 mmole/h) and a scavenger solution of triisobutylaluminum in hexane (0.060 L/h, 0.1955 mmole/h) were then pumped to the reactor for 20 min before monomers were introduced. Propylene (0.7778 L/h, 10 mole/h) was pumped to the reactor as a liquid. Ethylene was delivered as a gas solubilized in the chilled solvent in a controlled fashion through a mass flow meter/controller (19.8 g/h, 0.7071 mole/h). Continuous flow was established at a constant temperature and stirring. Onset of polymerization activity was determined by an observation of a viscous product. Once activity was established, one hour was provided to establish equilibrium. The resulting mixture, containing mostly solvent, polymer (6.19 wt %), and unreacted monomers was collected (1.0 h) in a can containing some alcohol to end the polymerization activity. A stabilizer was added to the polymer solution and mixed. The solvent was evaporated on a steam bath and the product dried under vacuum at 90° C. for 16 h. The resulting solid (220 g) showed 17.1 mol % ethylene by Fourier Transformation Infrared analysis (FTIR) (within the parameters set by ASTM D-3900), 1.5 Mooney Viscosity, 124,400 Daltons weight average molecular weight (Gel Permeation Chromatography (GPC) with Low Angle Laser Light Scattering Detector, hereafter referred to as LALLS) and molecular weight distribution (MWD) 1.79. The polymer solid is herein designated as Sample No. 1.

Example 2

In this example, Catalyst A was preactivated and used as described above to make a similar propylene based copolymer (Sample No. 2) with a slightly different composition. Reaction conditions were identical to above with the following modifications: ethylene was delivered as a gas solubilized in the chilled solvent in a controlled fashion through a mass flow meter/controller (12 g/h, 0.4286 mole/h). The resulting polymer solution was collected for 4 hours. After workup the resulting solid (720 g) showed a melting endotherm by DSC of 87.7° C., a glass transition (Tg) of −19.3° C., and a heat of fusion of 56.6 J/g. FTIR showed 12.0 mol % ethylene and the Mooney viscosity was 2.9. The weight average molecular weight (GPC with LALLS Detector) was 183,200 Daltons and the MWD was 1.77. The polymer was characterized to give Mooney viscosity (by Mooney Viscometer, ASTM D1648), ethylene content (by FTIR, ASTM D3900 or, for ethylene contents below 50 mol %, a modified D3900), ENB content (by FTIR, ASTM D6047), melt temperature and/or glass transition temperature (by DSC, described herein), and molecular weight (by GPC, described herein).

Example 3

In this example, Catalyst A (21 mg, 0.042 mmol) was prepared in the same general manner as Example 1. It was preactivated with dimethylanilinium-tetrakis (pentafluorophenyl)borate [DMAH$^+$ B(pfp$_4$)] (30 mg, 0.037 mmol) in toluene (75 mL) under an inert atmosphere. The mixture was allowed to equilibrate until complete solution was achieved (approximately 20 minutes). To the solvent-filled reactor, catalyst solution was pumped for approximately 5 minutes (34.8 mL/hr, 0.0197 mmol/hr) before a feed solution, composed of hexanes (11,250 mL), propylene (3,750 mL, 45.8 moles), triisobutylaluminum (25 wt. % in heptane, 4.64 mL) and ethylene (20 psig over 100 psig nitrogen), was pumped at a rate of approximately 100 mL/min. After equilibration at 75° C. for 30 minutes, the effluent from the reactor was collected for 72 minutes in three aliquots. Devolatization of the obtained mixture yielded a total of 636.4 g of solid product. (Sample No. 3) The product showed 8.2 mol % ethylene by FT-IR, melt viscosity of 152,900 cps at 190° C. (average of three aliquots), 98,100 Daltons weight average molecular weight and MWD of 1.68.

Example 4

In this example, dimethylsilandiylbis(2-methyle-4-phenyl-1-indenyl)zirconium dimethyl (150 mg, 0.255 mmol) was activated in the manner described above in Example 1 with dimethylanilinium-tetrakis (pentafluorophenyl)-borate [DIMAH$^+$ B(pfp$_4$)] (210 mg, 0.262 mmol) in toluene (900 mL) under an inert atmosphere. The mixture was allowed to equilibrate with stirring until complete solution was achieved (approximately 20 minutes). Hexanes were pumped (6.0 L/hr) into the 0.5 liter, liquid-filled, stirred tank reactor while the temperature was equilibrated to 80° C. using steam/water flowing through the reactor jacket. The pre-activated catalyst solution (9.0 mL/hr, 0.0255 mmol/hr) and scavenger (51.6 mL/hr, 0.128 mmol/hr) were pumped into the reactor for approximately 20 minutes before introduction of the monomers. Propylene (774 g/hr, 18.4 mol/hr) and 1-hexene (114 g/hr, 0.738 mol/hr) were introduced to the reactor as a chilled solution in the hexanes solvent stream. Commencement of polymerization activity was evidenced by a drop in the temperature of the water entering the reactor jacket. Continuous flow was established at a constant temperature with stirring. After the onset of polymerization, a minimum of 30 minutes was allotted for the establishment of steady state conditions. The effluent, consisting of solvent, unreacted monomers, and polymer, was collected for 60 minutes. Devolatilization of the obtained mixture yielded a total of 742.0 g of solid product. The product showed a melt viscosity of 21,550 cps @ 190° C. (Sample L).

Adhesive Testing

A number of hot melt adhesive compositions were prepared by blending the polymer, tackifier, antioxidant, and other ingredients such as plasticizer oil, wax, liquid resin tackifiers, etc. under low or high shear mixing at elevated temperatures to form a fluid melt. Mixing temperatures varied from about 130° C. to about 200° C., preferably from about 150° C. to about 180° C. In evaluating the performance characteristics of the adhesive compositions shown in Tables 3 through 6, test procedures "a" through "e" were employed:

a.) Adhesive Melt Viscosity (ASTM D-3236)—Melt viscosity profiles were measured at temperatures between 130° C. and 180° C. using a Brookfield Thermosel viscometer.

b.) Peel Strength (modified ASTM D1876)—Substrates (1×3 inches)) were heat sealed with adhesive film (5 mils in thickness) at 135° C. for 1 to 2 sec. and 40 psi. pressure. Bond specimens were peeled back in a tensile tester at a constant crosshead speed of 12 in/min. The average force required to peel the bond (5 specimen) apart was recorded.

c.) Shear Adhesion Fail Temperature (SAFT) (modified D4498) measures the ability of a bond to withstand an elevated temperature rising at 10° F./15 min., under a constant force that pulls the bond in the shear mode. Bonds 1 inch by 1 inch (Kraft paper) were formed of adhesive by heat sealing as in procedure "a.)" for 1.5 sec. The test specimens were suspended vertically in an oven at 32° C. with a 500 gram load attached to the bottom. The temperature at which the weight fell was recorded. Adhesives possessing high failure temperature are essential for the assembly of disposable articles or packaging goods that are often subjected to very high temperatures during storage and shipping.

d.) Tensile Strength and Elongation (ASTM D412 and ASTM D638)—75 mil pads were made and measured according to the ASTM procedures D412 and D638.

e.) ASTM E1356-95 was use for measuring the glass transition temperature of polymers (elastomers or plastics).

Hot Melt Adhesive Performance

A number of propylene-based copolymers (see Tables 3 and 4 for physical characteristics) were compounded with tackifiers, oil or wax and at least one stabilizer to form hot melt adhesive blends (see Tables 5 and 8). The properties of these blends were tested against typical blends containing EVA, SIS, SBS, LDPE (see Tables 5, 6, 7 and 8). Data in Tables 7 and 8 illustrate the effect of a low molecular weight isotactic polypropylene to induce crystallization. The data in Table 9 illustrate the performance of adhesive blends containing $C_3/C_6$ copolymers.

The semi-crystalline polymer (SCP) $C_3/C_2$ based hot melt adhesive (HMA) blends of the present invention exhibited several advantages over typical styrenic block copolymer disposable adhesive systems (see Table 5 and 8). The melt viscosities were indicative of the molecular weight of the copolymer. For example, the SCP based HMA blends having relative melt viscosities (i.e. Formulation 8 vs. SBS and SIS) had higher peel strengths in addition to higher tensile (cohesive) strength, and heat resistance (Shear Adhesion Failure Temperature (SAFT)), while maintaining comparable elongation. In the same fashion, $C_3/C_6$ copolymers also compared favorably to SBS- and SIS-based formulations (i.e. Table 9, formulation 28 vs. SBS and SIS in Table 3).

Both $C_3/C_2$ and the $C_3/C_6$ SCP based HMA blends demonstrated superior heat resistance (SAFT) and higher tensile strength versus metallocene catalyzed EXACT plastomers (see Tables 6 and 9). The $C_3/C_2$ and $C_3/C_6$ SCP based HMA blend systems also had superior peel strength, tensile strength, and elongation versus amorphous propylene-butene polymers such as REXTAC™ 2715 (see Tables 6 and 9).

Both tensile strength and SAFT were improved when small amounts of isotactic polypropylene (iPP) were added to the SCP based HMA blends (Tables 7, 8 and 9). The $C_3/C_2$ SCP based HMA blend systems also showed improved flexibility (elongation) and bond strength versus EVA based packaging formulations (see Table 8). Deficient elongation of $C_3/C_6$ SCP based blends was likely due to low SCP molecular weights (low melt viscosities, formulations 31 and 32, Table 9). Nonetheless, these formulations showed superior tensile strengths. One skilled in the art may blend the preferred additives stated in the present disclosure with formulations 21 and 22 to achieve comparable viscosity levels with formulations 23 and 24 and still expect to maintain superior tensile strength, peel strength, and elongation due to the presence of the disclosed isotactic polypropylene and SCP in the hot melt adhesive.

Hot melt adhesive blends may also be obtained with little modification. Formulation 30, comprised mainly of $C_3/C_6$ SCP, demonstrates superior tensile strength, elongation and heat resistance. One skilled in the art may blend the preferred additives stated in the present disclosure with formulation 30 to achieve improved adhesion while maintaining acceptable melt viscosity, tensile strength, and elongation.

TABLE 1

Reactor Conditions

| Sample # | Cement Conc (%) | Poly Rate (g/h) | Temp (° C.) | $C_2$ Feed (g/h) | $C_3$ Feed (g/h) | Cat A Feed (g/h) | $C_3$ Conversion (%) | Catalyst Efficiency (g/g) | Scav/Cat Ratio (mol/mol) |
|---|---|---|---|---|---|---|---|---|---|
| A | 6.19 | 230.5 | 51 | 20 | 420 | 0.0059 | 48.2 | 39115 | 16.4 |
| B | 6.52 | 246.4 | 51 | 12 | 420 | 0.0059 | 53.8 | 41822 | 16.4 |
| C | — | 525.0 | 75 | 99 | 816 | 0.0097 | 60.0 | 54124 | 93.6 |
| D | — | 490.2 | 80 | 99 | 816 | 0.0146 | 60.1 | 33575 | 62.4 |
| E | — | 444.0 | 90 | 74 | 816 | 0.0203 | 51.4 | 21872 | 44.9 |
| F | — | 435.0 | 80 | 99 | 816 | 0.0077 | 50.4 | 56494 | 117.6 |
| G | — | 489.0 | 80 | 74 | 816 | 0.0097 | 57.3 | 50412 | 93.6 |
| H | — | 458.4 | 85 | 124 | 816 | 0.0146 | 53.1 | 31397 | 62.4 |
| I | — | 546.6 | 80 | 74 | 816 | 0.0175 | 64.6 | 31234 | 52.1 |
| J | — | 586.2 | 85 | 124 | 816 | 0.0214 | 68.7 | 27393 | 42.6 |
| K | — | 607.2 | 85 | 148 | 816 | 0.0233 | 69.6 | 26060 | 39.1 |

Cement Conc.: % of polymer dissolved in solution
Scav/Cat Ratio = scavenger/catalyst ratio

TABLE 2

Reactor Conditions for Propylene-Hexene Copolymers

| Sample # | Poly Rate (g/h) | Temp (° C.) | $C_3$ Feed (g/h) | $C_6$ Feed (g/h) | Cat Feed (g/h) | Catalyst Efficiency (g/g) | Scav/Cat Ratio (mol/mol) |
|---|---|---|---|---|---|---|---|
| L | 742.2 | 80 | 774 | 114 | 0.0150 | 49,490 | 4.99 |
| M | 736.2 | 83 | 774 | 114 | 0.0150 | 49150 | 4.99 |
| N | 741.6 | 76 | 774 | 93 | 0.0150 | 49,490 | 4.99 |
| O | 670.2 | 79 | 774 | 138 | 0.0150 | 44,728 | 4.99 |
| P | 775.0* | 90 | 720 | 165** | 0.0164* | 48,534* | 4.84 |

*Blend of four aliquots (21517-024-004, -005, -006, and -008).
**Average values.

TABLE 3

SCP based HMA blend Physical Properties

| Sample # | Mol % $C_2$ | Tm, ° C. | ΔH (J/g) (Heat of fusion) | MI (dg/min) | GPC Mn (× 10³) | GPC Mw (× 10³) | Mw/Mn |
|---|---|---|---|---|---|---|---|
| A | 17.13 | — | — | (1.5)* | 69.4 | 124.4** | 1.79 |
| B | 12.0 | 88 | 56.6 | (2.9)* | — | 183.2** | 1.77 |
| C | 8.16 | 82 | 52.9 | 54 | 58.6 | 98.1 | 1.68 |
| D | — | 82 | 43.3 | 328 | 40.1 | 66.9 | 1.81 |
| E | 5.26 | 100 | 62.4 | 507 | 31.6 | 58.4 | 1.85 |
| F | 8.53 | 80 | 53.1 | 68 | 57.6 | 95.2 | 1.65 |
| G | 5.91 | 102 | 54.2 | 81 | 53.7 | 93.2 | 1.74 |
| H | 5.35 | 88 | 60.1 | 197 | 42.6 | 72.1 | 1.69 |
| I | 5.90 | 109 | 75.6 | 209 | 43.1 | 76.4 | 1.77 |
| J | 6.83 | 93 | 59.0 | 368 | 36.8 | 63.8 | 1.73 |
| K | 10.4 | 79 | 48.3 | 289 | 35.6 | 64.0 | 1.80 |

All the spectra were obtained at a temperature rate of 10 deg/min as described in the present application
*Mooney viscosity at 125° C.
**GPC-LALLS

TABLE 4

$C_3/C_6$ Physical Properties

| Sample # | Mol % $C_6$ | $T_m$, ° C. | ΔH (J/g) (Heat of fusion) | Melt Viscosity, cps @ 190° C. | Mn (× 10³) | Mw (× 10³) | Mz (× 10³) |
|---|---|---|---|---|---|---|---|
| L | | 102 | 96.1 | 21,550 | | | |
| M | | 101 | 76.1 | 8,513 | | | |
| N | | 107 | 96.6 | 35,300 | | | |
| O | | 93 | 58.5 | 66,000 | | | |
| P* | | 99** | 60.8** | 2230** | | | |

*Blend of four aliquots (21517-024-004, -005, -006, and -008).
**Average values.

TABLE 5

Evaluation of SCP based HMA blends in a Disposable Product Formulation

| Sample # | | | FORMULATION # | | | | | | | | | | |
|---|---|---|---|---|---|---|---|---|---|---|---|---|---|
| | | | 1 | 2 | 3 | 4 | 5 | 6 | 7 | 8 | 9 | 10 | 11 |
| Typical SIS Performing Adhesives[1] | 100 wt % | | — | — | — | — | — | — | — | — | — | — | — |
| Typical SBS Performing Adhesives[2] | | 100 wt % | — | — | — | — | — | — | — | — | — | — | — |
| | $T_m$/MI | | | | | | | | | | | | |
| A | 72/ca 1 | | 30 | — | — | — | — | — | — | — | — | — | — |
| B | 91/ca 1 | | — | 30 | — | — | — | — | — | — | — | — | — |
| C | 81/54 | | — | — | 30 | — | — | — | — | — | — | — | — |
| D | 84/328 | | — | — | — | 30 | — | — | — | — | — | — | — |
| E | 102/507 | | — | — | — | — | 30 | — | — | — | — | — | — |
| F | 87/68 | | — | — | — | — | — | 30 | — | — | — | — | — |
| G | 101/81 | | — | — | — | — | — | — | 30 | — | — | — | — |
| H | 89/197 | | — | — | — | — | — | — | — | 30 | — | — | — |
| I | 105/209 | | — | — | — | — | — | — | — | — | 30 | — | — |
| J | 94/368 | | — | — | — | — | — | — | — | — | — | 30 | — |
| K | 78/237 | | — | — | — | — | — | — | — | — | — | — | 30 |
| ESCOREZ ™ 5380[3] | | | — | — | 50 | 50 | 50 | 50 | 50 | 50 | 50 | 50 | 50 | 50 |
| KAYDOL ™ Oil[4] | | | — | — | 20 | 20 | 20 | 20 | 20 | 20 | 20 | 20 | 20 | 20 |
| IRGANOX ™ 1010[5] | | | — | — | 0.25 | 0.25 | 0.25 | 0.25 | 0.25 | 0.25 | 0.25 | 0.25 | 0.25 | 0.25 |
| | TEMP | | | | | | | | | | | | |
| Viscosity, cps | 140° C. | | 4288 | 3625 | 106,750 | 99,750 | 13,400 | 2,550 | 1,858 | 10,225 | 11,375 | 3,830 | 3,663 | 2,410 | 2,885 |
| | 150° C. | | 2440 | 2380 | 72,300 | 68,100 | 9,300 | 1,805 | 1,325 | 7,125 | 7,900 | 2,705 | 2,595 | 1,698 | 2,050 |
| | 160° C. | | 1610 | 1620 | 52,300 | 49,400 | 6,763 | 1,318 | 978 | 5,163 | 5,763 | 1,975 | 1,885 | 1,245 | 1,493 |
| | 170° C. | | — | — | 38,100 | 35,700 | 5,050 | 955 | 740 | 3,825 | 4,275 | 1,480 | 1,418 | 930 | 1,125 |
| | 180° C. | | — | — | 29,050 | 27,300 | 3,830 | 770 | 585 | 2,950 | 3,250 | 1,140 | 1,093 | 713 | 870 |
| Tensile Strength, psi | | | 94 | 90 | 411 | 260 | 232 | 57 | 174 | 201 | 405 | 252 | 212 | 178 | 92 |
| Elongation, % | | | 1940 | 1850 | 1860 | 970 | 1094 | 211 | 270 | 869 | 1050 | 928 | 309 | 360 | 257 |
| | Substrate | | | | | | | | | | | | |
| 180° Peel Str, pli | Al[3] | | 4.6 | 5.0 | 7.7 | 6.9 | 4.2 | 4.7 | 2.4 | 6.9 | 3.6 | 3.9 | 2.4 | 3.7 | 5.1 |
| | PP[4] | | 4.3 | 3.9 | 7.6 | 8.8 | 6.9 | 5.4 | 1.8 | 5.1 | 10.1 | 5.8 | 5.6 | 5.1 | 7.4 |
| | PE[5] | | 4.7 | 4.6 | 7.5 | 3.9 | 2.2 | 5.1 | 0.4 | 5.0 | 2.8 | 2.7 | 1.1 | 3.2 | 6.1 |
| SAFT to Kraft, ° C., (1" × 1", 500 g) | | | 74 | 54 | 73 | 88 | 78 | 65 | 75 | 79 | 89 | 78 | 89 | 76 | 57 |

[1]Formulation: 22/58/20 blend of VECTOR 4215, ESCOREZ 5400, KAYDOL oil
[2]Formulation: 20/60/20 blend of VECTOR 4461, ESCOREZ 5600, KAYDOL oil
[3]Al = aluminum
[4]PP = polypropylene
[5]PE = polyethylene

TABLE 6

SCP Polymers vs. Other Polyolefin Polymers in a Hot Melt Adhesive

| | FORMULATION # | | | | | | |
|---|---|---|---|---|---|---|---|
| Sample # | 12 | 13 | 14 | 7 | 6 | 3 | 15 |
| EXACT ™ 4023 (125 MI/0.882) | 30 | — | — | — | — | — | — |
| EXACT ™ 4040 (50 MI/0.885) | — | 30 | — | — | — | — | — |
| EXACT ™ 4038 (125 MI/0.885) | — | — | 30 | — | — | — | — |
| REXTAC ™ 2715 | — | — | — | — | — | — | 100 |
| Sample G | — | — | — | 30 | — | — | — |
| Sample F | — | — | — | — | 30 | — | — |
| Sample C | — | — | — | — | — | 30 | — |
| ESCOREZ ™ 5400 | 50 | 50 | 50 | — | — | — | — |
| ESCOREZ ™ 5380 | — | — | — | 50 | 50 | 50 | — |

TABLE 6-continued

SCP Polymers vs. Other Polyolefin Polymers in a Hot Melt Adhesive

| Sample # | FORMULATION # | | | | | | |
|---|---|---|---|---|---|---|---|
| | 12 | 13 | 14 | 7 | 6 | 3 | 15 |
| KAYDOL ™ OIL | 20 | 20 | 20 | 20 | 20 | 20 | — |
| IRGANOX ™ 1010 | — | — | — | — | — | — | — |
| MELT VISCOSITY, cps | | | | | | | |
| 130° C. | 18,025 | 21,400 | 10,552 | 11,375 | 10,225 | 13,400 | — |
| 140° C. | 12,825 | 15,150 | 7,475 | 7,900 | 7,125 | 9,300 | 13,625 |
| 150° C. | 9,325 | 11,025 | 5,475 | 5,763 | 5,163 | 6,763 | 4,963 |
| 160° C. | 6,875 | 8,275 | 4,088 | — | — | — | 3,650 |
| SAFT, ° C., (1" × 1", 500 g) | 56.9 | 58.3 | 56.9 | 89 | 79 | 78 | 80 |
| TENSILE STRENGTH, psi | 81.6 | 62.3 | 45.3 | 405 | 201 | 232 | 78 |
| ELONGATION, % | 1294 | 1218 | 342 | 1050 | 869 | 1094 | 102 |
| PEEL STRENGTH, pli | | | | | | | |
| Aluminum | 11.7 | 11.8 | 8.2 | 3.6 | 6.9 | 4.2 | 2.2 |
| Polypropylene | 16.1 | 11.9 | 5.8 | 10.1 | 5.1 | 6.9 | 1.1 |
| Polyethylene | 12.8 | 9.8 | 6.5 | 2.8 | 5.0 | 2.2 | 4.4 |

EXACT ™ 4040, 4023, 4038, ESCOREZ ™ 5400, and 4038 are trademarks of the Exxon Chemical Company.
REXTAC ™ 2715 is commercially available from Rexene, having a crystallinity of less than 9 J/g.

TABLE 7

Effect of iPP Nucleating Agent in SCP based Hot Melt Adhesives

| Component | $T_m$/MI | Formulation # | | | | | | | |
|---|---|---|---|---|---|---|---|---|---|
| | | 4 | 16 | 9 | 17 | 10 | 18 | 11 | 19 |
| Sample D | 84/328 | 30 | 25 | — | — | — | — | — | — |
| Sample I | 105/209 | — | — | 30 | 25 | — | — | — | — |
| Sample J | 94/368 | — | — | — | — | 30 | 25 | — | — |
| Sample K | 78/237 | — | — | — | — | — | — | 30 | 25 |
| Achieve 3866G (iPP Nucleating Agent) | (1500 MFR) | — | 5 | — | 5 | — | 5 | — | 5 |
| ESCOREZ ™ 5380 | | 50 | 50 | 50 | 50 | 50 | 50 | 50 | 50 |
| KAYDOL ™ Oil | | 20 | 20 | 20 | 20 | 20 | 20 | 20 | 20 |
| IRGANOX ™ 1010 | | 0.25 | 0.25 | 0.25 | 0.25 | 0.25 | 0.25 | 0.25 | 0.25 |
| | TEMP | | | | | | | | |
| Viscosity, cps | 140° C. | 2,550 | 2,400 | 3,663 | 2,845 | 2,410 | 2,330 | 2,885 | 2,755 |
| | 150° C. | 1,805 | 1,698 | 2,595 | 2,055 | 1,698 | 1,655 | 2,050 | 1,955 |
| | 160° C. | 1,318 | 1,245 | 1,885 | 1,505 | 1,245 | 1,213 | 1,493 | 1,415 |
| | 170° C. | 955 | 940 | 1,418 | 1,100 | 930 | 913 | 1,125 | 1,073 |
| | 180° C. | 770 | 725 | 1,093 | 828 | 713 | 695 | 870 | 828 |
| Tensile Str, psi | | 57 | 78 | 212 | 184 | 178 | 116 | 92 | 85 |
| Elongation, % | | 211 | 234 | 309 | 198 | 360 | 229 | 257 | 237 |
| | Substrate | | | | | | | | |
| Peel Str, pli | Al | 4.7 | 3.8 | 2.4 | 3.0 | 3.7 | 4.1 | 5.1 | 6.8 |
| | PP | 5.4 | 3.5 | 5.6 | 2.9 | 5.1 | 1.5 | 7.4 | 7.1 |
| | PE | 5.1 | 5.7 | 1.1 | 0.8 | 3.2 | 0.4 | 6.1 | 4.6 |
| SAFT to Kraft, ° C., (1" × 1", 500 g) | | 65 | 66 | 89 | 96 | 76 | 82 | 57 | 63 |

TABLE 8

Effect of iPP Nucleating Agent in a SCP based HMA Packaging System

| Component | | Formulation # | | | | |
|---|---|---|---|---|---|---|
| | | 20 | 21 | 22 | 23 | 24 |
| A | | 30 | 30 | 25 | — | — |
| ESCORENE UL ™ 7750 | | — | — | — | 30 | 30 |
| ACHIEVE ™ 3866G | 1500 MFR | — | — | 5 | — | — |
| iPP | 400 MFR | — | — | — | — | 5 |
| ESCOREZ ™ 5380 | | 40 | 50 | 40 | — | — |
| ESCOREZ ™ 5400 | | — | — | — | 55 | 55 |
| ECR-327 | | 30 | — | 30 | — | — |
| Wax | | — | 20 | — | 15 | 10 |
| IRGANOX ™ 1010 | | 0.25 | 0.25 | 0.25 | 0.25 | 0.25 |
| | TEMP | | | | | |
| Viscosity, cps | 150° C. | 26,950 | 17,000 | 21,600 | 1,120 | 2,440 |
| | 160° C. | 18,575 | 12,700 | 15,325 | 830 | 1,750 |
| | 170° C. | 13,800 | 9,410 | 11,300 | 615 | 1,320 |
| | 180° C. | 10,175 | 7,350 | 8,425 | 480 | 1,015 |
| Tensile Strength, psi | | 540 | 210 | 470 | 546 | 527 |
| Elongation, % | | 2,050 | 2,175 | 1,760 | 230 | 170 |
| | Substrate | | | | | |
| Peel Strength, pli | Al | 10.8 | 1.35 | 8.1 | 0.15 | 0.1 |
| | PP | 1.35 | 0.4 | 0.2 | — | — |
| | PE | 0.5 | 1.0 | 1.0 | — | — |
| SAFT to Kraft, ° C. (0.5" × 0.5", 500 g) | | 69 | 69 | 96 | 63 | 63 |

Experiments which involve other examples of this invention will now be described. In Examples 5–8, three copolymers and one copolymer blend were used. The three copolymers are designated below as C1, C2 and C3, while the blend is designated as B1. The blend contains a mixture of a copolymer and an Achieve product, which is a commercially available isotactic crystalline polypropylene in the weight ratio of 70/30. The respective ethylene contents of C1, C2, C3 and B1 are 11.5 wt %, 11.8 wt %, 15.7 wt % and 11.0 wt %.

Example 5

In this example, C1 was degraded in a laboratory single screw extruder at 210° C. with Lupersol 101 peroxide as the free radical initiator [2,5-bis(tert-butylperoxy)-2,5-dimethyl-hexane]. Four different levels of peroxide were used in each experiment (nominally 0.33, 0.67, 1.00 and 1.50 wt %), by coating the polymer pellets with the peroxide. However, the amount of peroxide that remained on the polymer for degradation was about 8 to 10 wt % less than the nominal amounts added. The characterization data for the four degraded samples are shown in Table 10. A C1 control sample (C1-0) with no peroxide added but subjected to the same shear forces in the single screw extruder was used for comparison purposes in Table 10.

In the experiments with C1, FIG. 1 the addition of 1.5 wt % peroxide raised the MFR of the copolymer to about 1100. Intermediate levels of peroxide produced copolymer with MFRs having essentially proportionate levels of MFR. The tests showed that the rise in the MFR corresponded to the

TABLE 9

Evaluation of Propylene-hexene Polymers in a Hot Melt Adhesive

| Sample # | $T_m$(° C.)/Viscosity (cps @ 190° C.) | FORMULATION # | | | | | | | |
|---|---|---|---|---|---|---|---|---|---|
| | | 25 | 26 | 27 | 28 | 29 | 30 | 31 | 32 |
| L | 101/21,550 | 30 | — | — | — | — | — | 30 | — |
| M | | — | 30 | — | — | 25 | — | — | 30 |
| N | | — | — | 30 | — | — | — | — | — |
| O | | — | — | — | 30 | — | — | — | — |
| P | | — | — | — | — | — | 80 | — | — |
| Achieve 3866G | (1500 MFR) | — | — | — | — | 5 | — | — | — |
| ESCOREZ ™ 5380 | | 50 | 50 | 50 | 50 | 50 | 15 | 50 | 50 |
| KAYDOL OIL ™ | | 20 | 20 | 20 | 20 | 20 | 5 | — | — |
| PARAFLINT H1 | | — | — | — | — | — | — | 20 | 20 |
| IRGANOX ™ 1010 | | 0.25 | 0.25 | 0.25 | 0.25 | 0.25 | 0.25 | 0.25 | 0.25 |
| Melt Viscosity, cps | | | | | | | | | |
| 130° C. | | 3,355 | 2,335 | 5,388 | 7,538 | 2,515 | 9,575 | 2,350 | 2,080 |
| 140° C. | | 2,320 | 1,605 | 3,630 | 5,113 | 1,703 | 6,650 | 1,733 | 1,453 |
| 150° C. | | 1,640 | 1,140 | 2,560 | 3,545 | 1,203 | 4,800 | 1,193 | 1,055 |
| 160° C. | | 1,203 | 845 | 1,870 | 2,580 | 888 | 3,540 | 835 | 790 |
| 170° C. | | 908 | 640 | 1,405 | 1,930 | 670 | 2,710 | 610 | 608 |
| 180° C. | | 710 | 520 | 1,085 | 1,485 | 518 | 2,110 | 425 | 478 |
| Tensile Strength, psi | | 277.2 | 127.9 | 302.5 | 383.5 | 164.9 | 1451.8 | 631.2 | 875 |
| Elongation, % | | 756.6 | 492.3 | 499.6 | 813.4 | 368.3 | 768.3 | 34.2 | 13.9 |
| Peel Strength, pli | | | | | | | | | |
| Al[3] | | 3.3 | 3.3 | 2.97 | 4.1 | 2.4 | 0.19 | 0.04 | 0.02 |
| PP[4] | | 3.8 | 2.7 | 3.3 | 5.8 | 6.5 | 0.07 | 0.01 | 0.01 |
| PE[5] | | 0.74 | 1.64 | 0.48 | 2.5 | 0.88 | 0.06 | 0.13 | 0.08 |
| SAFT to Kraft, ° C. (1" × 1", 500 g) | | 77.2 | 73.9 | 83.3 | 76 | 87 | 102.5 | 91.6 | 86.4 |

[1]Formulation: 22/58/20 blend of VECTOR 4215, ESCOREZ 5400, KAYDOL oil
[2]Formulation: 20/60/20 blend of VECTOR 4461, ESCOREZ 5600, KAYDOL oil
[3]Al = aluminum
[4]PP = polypropylene
[5]PE = polyethylene lower Mn of the polymers. The Mn dropped from approximately 87K to about 25K on the addition of 1.5% peroxide. Intermediate levels of peroxide provided correspondingly intermediate levels of Mn although the largest effect on the molecular weight appeared to be the initial amount of copolymer. The data for the change in both the MFR and the Mn are consistent with the random chain scission reaction in a well mixed reaction. Similar trends were apparent for the variation of the Mw with the amount of peroxide used. The combination of similar trends in the number and weight average of the polymers indicated a relative constancy in the PDI at about 2.0 for the entire range of the degraded polymers.

The mechanical properties of the degraded C1 copolymers of Table 10 are shown below in Table 11. The tensile strength as well as the rise in the extensional modulus due to strain induced crystallization at extensions beyond 500% were severely depressed upon degradation. It is contemplated that this is due to the smaller chains in the degraded polymers, which are less capable of crystallizing to form a connected network. It is noted that the low extensional tensile strength (less than 500%), and the maximum elongation, were not substantially affected by the degradation in molecular weight.

TABLE 10

| Peroxide Level (with C1) (wt %) | MFR | Mn (GPC) (× 1000) | Mw (GPC) (× 1000) | Mw (LALLS) (× 1000) | Mz (LALLS) (× 1000) | PDI |
|---|---|---|---|---|---|---|
| — | 15.5 | 86.9 | 154.8 | 164.5 | 252.2 | 1.9 |
| 0.33 | 258 | 41.9 | 77.7 | 79.2 | 123.5 | 1.9 |
| 0.66 | 443 | 35.0 | 67.7 | 70.9 | 136.2 | 2.1 |
| 1.00 | 805 | 29.6 | 60.6 | 62.4 | 105.9 | 2.1 |
| 1.50 | 1129 | 25.5 | 55.0 | 55.9 | 112.4 | 2.0 |

TABLE 11

| Peroxide Level (with C1) (wt %) | Tensile Strength (psi) | Elongation (%) |
|---|---|---|
| — | 3642 | 783 |
| 0.33 | 1846 | 860 |
| 0.66 | 1767 | 987 |
| 1.00 | 1518 | 854 |
| 1.50 | 1428 | 882 |

Example 6

In this example, C2 samples were degraded in a laboratory intensive mixer/extruder at 19° C.–210° C. with the peroxide initiator used in Example 10. Five different levels of peroxide were used (nominally 0.4, 0.8, 1.2, 1.6 and 2.0 wt %). Again, the actual levels of peroxide were slightly lower (about 8–10 wt %) for the experiments that used larger amounts of peroxide due to some material losses during transfer. A control sample (C2-0) was used for comparison purposes, having no peroxide added but subjected to the same shear forces in the single screw extruder as the other samples. Mechanical properties of the degraded polymers were also measured. The results for C2 are reported below in Tables 12 and 13.

The addition of about 1.8 wt % peroxide raised the MFR of the C2 copolymer to about 1300. Intermediate levels of peroxide produced essentially proportionate MFR levels. It is contemplated that the rise in the MFRs of the samples are correlated to the lower Mn of the polymers. The Mn dropped from approximately 90K to about 25K on the addition of 1.8 wt % peroxide. Intermediate levels of peroxide provided intermediate levels of Mn, although the largest effect on the molecular weight appears to be the initial amount of copolymer. The data for the change in both the MFR and the Mn were consistent with a random chain scission reaction in a well-mixed reaction. Similar trends can be seen based on the variation of the Mw with the amount of peroxide used. The combination of similar trends in the number and weight average of the polymers indicated a relative constancy in the PDI at about 2.0 for the entire range of the degraded polymers.

As reflected in Table 13 below, the degradation in the molecular weight of the C2 copolymer was reflected in the mechanical properties of the polymer. The tensile strength as well as the rise in the extensional modulus due to strain induced crystallization at extensions beyond 400% are severely depressed upon degradation. This is contemplated to be due to the smaller chains in the degraded polymers which are less capable of crystallizing to form a connected network. It is noted that the low extensional strength (less than 500%) and the maximum elongation were not substantially affected by the degradation in molecular weight.

TABLE 12

| Peroxide Level (with C2) (wt %) | MFR | Mn (GPC) (× 1000) | Mw (GPC) (× 1000) | Mw (LALLS) (× 1000) | Mz (LALLS) (× 1000) | PDI |
|---|---|---|---|---|---|---|
| — | 13.8 | 89.8 | 162.9 | 172.2 | 252.3 | 1.9 |
| 0.4 | 364 | 39.6 | 72.7 | 74.4 | 148.3 | 1.9 |
| 0.8 | 710 | 30.9 | 62.8 | 60.9 | 105.0 | 2.0 |
| 1.2 | 884 | 28.6 | 60.1 | 61.2 | 121.3 | 2.1 |
| 1.6 | 1005 | 26.7 | 58.5 | 57.1 | 107.3 | 2.1 |
| 2.0 | 1341 | 24.5 | 54.9 | 55.1 | 133.7 | 2.2 |

TABLE 13

| Peroxide Level (with C2) (wt %) | Tensile Strength (psi) | Elongation (%) |
|---|---|---|
| — | 3706 | 769 |
| 0.4 | 1758 | 860 |
| 0.8 | 1601 | 812 |
| 1.2 | 1532 | 808 |
| 1.6 | 1441 | 821 |
| 2.0 | 1384 | 909 |

Example 7

In this example, C3 samples were degraded in a laboratory intensive mixer/extruder at 190° C.–210° C. with the peroxide initiator used in Example 10. Five different levels of peroxide were used (nominally 0.4, 0.8, 1.2, 1.6 and 2.0 wt %), with actual levels of peroxide being slightly lower (about 8–10 wt %) for the experiments that used large amounts of peroxide. A control sample (C3-0) was used for comparison purposes, having no peroxide added but subjected to the same shear forces in the single screw extruder as the other samples. Mechanical properties of the degraded polymers were also measured. The results for C3 are reported in Tables 14 and 15.

In the experiments with C3, the addition of about 1.8 wt % peroxide raised the MFR of the copolymer to about 1300. Intermediate levels of peroxide produced essentially proportionate levels of MFR. The rise in the MFR corresponded to the lower Mn of the polymers. The Mn dropped from approximately 95K to about 22K upon addition of 1.8 wt % peroxide. Intermediate levels of peroxide provided intermediate levels of Mn although the largest effect on molecular weight appears to be the initial amount of copolymer. The data for the change in both MFR and Mn are consistent with a random chain scission reaction in a well-mixed reaction. Similar trends were seen for the variation of the Mw with the amount of peroxide used. The combination of similar trends in the number and weight average of the polymers indicates a relative constancy in the PDI at about 2.0 for the entire range of the degraded polymers.

As reflected in Table 15 below, the degradation in the molecular weight of the C3 copolymer was reflected in the mechanical properties of the polymer. The tensile strength as well as the rise in the extensional modulus due to strain induced crystallization at extensions beyond 400% were severely depressed on degradation. This reached an extreme at peroxide levels of 2.0 wt % where the sample showed elongation substantially lower than 500%. This is contemplated to be due to the smaller chains in the degraded polymers which are less capable of crystallizing to form a connected network. It is noted that the low tensile strength (less than 500%), and the maximum elongation, at intermediate molecular weights were severely affected by the degradation in molecular weight. This suggests that the extreme elastic elongation of copolymers may tend to be limited at low molecular weights (MFR greater than 1000) for the most amorphous systems.

TABLE 14

| Peroxide Level (with C3) (wt %) | MFR | Mn (GPC) (× 1000) | Mw (GPC) (× 1000) | Mw (LALLS) (× 1000) | Mz (LALLS) (× 1000) | PDI |
|---|---|---|---|---|---|---|
| — | 8.2 | 94.6 | 164.4 | 167.8 | 241.2 | 1.8 |
| 0.4 | 307 | 38.7 | 70.2 | 71.4 | 162.4 | 1.8 |
| 0.8 | 665 | 30.7 | 59.9 | 59.4 | 108.8 | 1.9 |
| 1.2 | 1062 | 27.5 | 53.4 | 52.9 | 109.8 | 1.9 |
| 1.6 | 1110 | 24.9 | 52.8 | 53.7 | 111.9 | 2.1 |
| 2.0 | 1331 | 22.9 | 52.3 | 52.0 | 130.8 | 2.1 |

TABLE 15

| Peroxide Level (with C3) (wt %) | Tensile Strength (psi) | Elongation (%) |
|---|---|---|
| — | 2219 | 837 |
| 0.4 | 1013 | 1185 |
| 0.8 | 709 | 1189 |
| 1.2 | 455 | 1211 |
| 1.6 | 449 | 1195 |
| 2.0 | 9 | 595 |

Example 8

In this example, B1 was degraded in a single screw extruder at 190° C.–210° C. with the peroxide initiator. Four different levels of peroxide (nominally 0.33, 0.67, 1.00 and 1.50 wt %) were used for each experiment, again, with actual amounts of peroxide being lower. The characterization data for the four degraded samples are shown in Table 16 below. Mechanical properties are reported in Table 17. A control sample (B1-0) was prepared with no peroxide added but which had been subjected to the same shear forces in the single screw extruder, to be used for comparison purposes.

In the experiments with B1, the addition of 1.5 wt % peroxide raises the MFR of the copolymer to about 1700, as shown in Table 16. This rise in MFR was substantially greater than the rise in MFR for the copolymer alone (C1-C3). In accordance with this invention, it is contemplated that this substantially greater MFR increase is due to the preferential degradation of the isotactic polypropylene component of the blend. Intermediate levels of peroxide produced correspondingly higher MFRs, as shown in Table 16. The rise of MFR of the B1 samples corresponded to the lower Mn of the polymers. The Mn dropped from approximately 73K to about 25K upon addition of 1.5 wt % peroxide. Intermediate levels of peroxide provided intermediate levels of Mn although the largest effect on the molecular weight appeared to be the initial amount of copolymer. The data for the change in both MFR and Mn are consistent with a random change scission reaction in a well-mixed reaction. Similar trends are apparent for the variation of the Mw with the amount of peroxide used, The combination of similar trends in the number and weight average of the polymers indicates a relative constancy in the PDI at about 2.0 for the entire range of the degraded polymers.

As reflected in Table 17 below, the degradation in the molecular weight of the M1 blend is reflected in its mechanical properties. Both the tensile strength and the rise in extensional modulus due to strain induced crystallization at extensions beyond 500% were severely depressed upon degradation. This is contemplated to be due to the smaller chains in the degraded polymers, which are less capable of crystallizing to form a connected network. In contrast to the other degraded copolymers (C1–C3), the elongation of the blend was severely retarded by the degradation. Since the degradation of the copolymer alone did not lead to this effect, it is contemplated to be due to the exceptionally low molecular weight of the polypropylene component of the blend. It is noted that the low extensional tensile strength (less then 500%), and the maximum elongation, were not substantially affected by the degradation in molecular weight.

TABLE 16

| Peroxide Level (with M1) (wt %) | MFR | Mn (GPC) (× 1000) | Mw (GPC) (× 1000) | Mw (LALLS) (× 1000) | Mz (LALLS) (× 1000) | PDI |
|---|---|---|---|---|---|---|
| — | 33 | 72.9 | 139.7 | 147.4 | 217.3 | 2.0 |
| 0.33 | 360 | 38.6 | 75.8 | 74.9 | 131.8 | 1.9 |
| 0.66 | 883 | 30 | 60.1 | 58.8 | 125.3 | 1.9 |
| 1.00 | 1087 | 29.4 | 57.3 | 58.8 | 146.7 | 2.0 |
| 1.50 | 1736 | 25.2 | 52.2 | 52.8 | 135.4 | 2.1 |

TABLE 17

| Peroxide Level (with M1) (wt %) | Tensile Strength (psi) | Elongation (%) |
|---|---|---|
| — | 2373 | 645 |
| 0.33 | 1700 | 606 |
| 0.66 | 1586 | 149 |
| 1.00 | 1596 | 51 |
| 1.50 | 1371 | 45 |

Example 9

In this example, the MFR values of certain samples were measured in accordance with ASTM 1238 @ 230° C. All measured Melt Index (MI) values were measured at 190° C., with a 2.16 kg weight. DSC was used to measure the reported melting point values. The samples were formed into a film annealed for at least 48 hours, and the temperature of the first melt was measured. The GPC molecular weight values were measured against polystyrene standard. Sample 16 was made using 45 grams of EP copolymer degraded with 0.44 gram of Lupersol 101 in a Brabender. Samples J6 and K6 were synthesized in a reactor using a metallocene catalyst.

TABLE 18

| Physical Data | Sample A6 | Sample B6 Achieve | Sample C6 | Sample D6 | Sample E6 | Sample F6 |
|---|---|---|---|---|---|---|
| Lupersol 101 (g) | — | — | 5.56 | 8.79 | 13.3 | 2.93 |
| MFR (mean) | 10.480 | 55.140 | 442.811 | 804.895 | 1129.232 | 359.626 |
| Std. Dev. | 0.0188 | 0.0000 | 0.1443 | 0.2356 | 0.0000 | 0.1753 |
| Var. Coeff. | 0.1037 | 0.0000 | 0.2585 | 0.2319 | 0.0000 | 0.3867 |
| Shear Rate (sec −1) | 25.63 | 134.70 | 1081.65 | 1968.23 | 2759.64 | 878.64 |
| Viscosity (Pascals) | 757 | 144 | 18 | 10 | 7 | 22 |
| Brookfield Viscosity (cps @ 190C.) | — | — | 49,200 | 28,000 | 22,400 | 60,500 |
| Measured MI | — | — | — | 361 | 517 | 161 |
| Tm (° C.) | 76.0 | 157.0 | 76.0 | 78.8 | 75.5 | 148.6 |
| Heat of Fusion (J/g) | 42.34 | 64.94 | 40.01 | 38.50 | 37.91 | 29.70 |
| Tc (° C.) | 13.5 | 104.7 | 16.9 | 22.3 | 18.6 | 98.0 |
| Heat of Crystallization (J/g) | 20.19 | 76.49 | 18.88 | 19.85 | 20.25 | 37.53 |
| GPC | | | | | | |
| Mn | 93,300 | — | 35,000 | 29,600 | 25,500 | 38,600 |
| Mw | 164,900 | — | 67,900 | 60,600 | 55,000 | 75,800 |
| Mz | 255,200 | — | 110,800 | 107,600 | 100,700 | 124,800 |
| Mw/Mn | 1.77 | — | 1.94 | 2.05 | 2.16 | 1.96 |

TABLE 19

| Physical Data | Sample G6 | Sample H6 | Sample I6 | Sample J6 | Sample K6 |
|---|---|---|---|---|---|
| Lupersol 101 (g) | 5.86 | 13.3 | — | — | — |
| MFR (mean) | 882.609 | 1735.877 | — | — | — |
| Std. Dev. | 0.0000 | 0.9393 | — | — | — |
| Var. Coeff. | 0.000 | 0.9393 | — | — | — |
| Shear Rate (sec −1) | 2158.55 | 4243.34 | — | 158,400 | 13,200 |
| Viscosity (Pascals) | 9 | 5 | — | 54 | 328 |
| Brookfield Viscosity (cps @ 190 C) | 25,100 | 11,700 | 13,000 | — | — |
| Measured MI | 281 | 517 | — | — | — |
| Tm (° C.) | 151.2 | 149.7 | — | 81 | 84 |
| Heat of Fusion (J/g) | 27.13 | 26.36 | — | 32.92 | 24.75 |
| Tc (° C.) | 101.1 | 102.7 | — | 35 | 37 |
| Heat of Crystallization (J/g) | 33.27 | 32.95 | — | 39.44 | 33.09 |
| GPC | | | | | |
| Mn | 30,000 | 25,200 | — | 58,280 | 40,065 |
| Mw | 60,100 | 52,200 | — | 98,131 | 66,892 |
| Mz | 101,200 | 91,500 | — | 139,588 | 94,398 |
| Mw/Mn | 2.00 | 2.07 | — | 1.68 | 1.67 |

Example 10

In this example, the polymer samples used in Example 9 were modified by adding various combinations of certain ingredients to form adhesive compositions, namely, ESCOREZ 5380 (Ingr. #1), KAYDOL (Ingr. #2), PARAFLINT WAX (Ingr. #3) and Irganox 1010 (Ingr. #4). Each modified sample was made via extruder breakdown. Certain samples included isotactic polypropylene in addition to ethylene-propylene copolymer.

The compositions of the samples are shown in Table 20. The first column identifies the polymer samples from Example 9 used to make the modified Samples A7–H7. Isotactic polypropylene was added to the Samples F6 and G6 ethylene-propylene copolymers, in the amount of about 50 wt % of the total polymer weight. The second column indicates the viscosity of each Example 9 polymer. The third column indicates the estimated Melt Index of each Example 9 polymer. The remaining columns reflect the weight percentages of the ingredients for each of Samples A7–H7. It is noted that Samples A7–D7 have properties considered to be desirable for use in disposable products while Samples E7–H7 have properties desirable for packaging.

TABLE 20

| Ex. 6 Sample | Visc. (× 000) | MI | A7 | B7 | C7 | D7 | E7 | F7 | G7 | H7 |
|---|---|---|---|---|---|---|---|---|---|---|
| C6 | 49 | 146 | 30 | — | — | — | 30 | — | — | — |
| F6 | 60.5 | 122 | — | 30 | — | — | — | 30 | — | — |
| D6 | 28 | 236 | — | — | 30 | — | — | — | 30 | — |
| G6 | 25.1 | 259 | — | — | — | 30 | — | — | — | 30 |
| Ingr. #1 | — | — | 50 | 50 | 50 | 50 | 50 | 50 | 50 | 50 |
| Ingr. #2 | — | — | 20 | 20 | 20 | 20 | — | — | — | — |
| Ingr. #3 | — | — | — | — | — | — | 20 | 20 | 20 | 20 |
| Ingr. #4 | — | — | 0.25 | 0.25 | 0.25 | 0.25 | 0.25 | 0.25 | 0.25 | 0.25 |

Example 11

In this example, the melt viscosities (in cps) of the Example 10 samples (Samples A7–H7) were measured at different temperatures, and the results are reflected in Table 21 below, being identified as Samples A8–H8. Those same samples were also measured for tensile strength and elongation, and the results are shown in Table 22 below.

TABLE 21

| Temp (° C.) | A8 | B8 | C8 | D8 | E8 | F8 | G8 | H8 |
|---|---|---|---|---|---|---|---|---|
| 140 | 4,513 | 3,938 | 2,675 | 1,498 | 3,805 | 4,613 | 2,310 | 2,340 |
| 150 | 3,175 | 2,745 | 1,890 | 1,060 | 2,770 | 3,270 | 1,660 | 1,683 |
| 160 | 2,335 | 1,980 | 1,375 | 703 | 2,070 | 2,450 | 1,243 | 1,265 |
| 170 | 1,743 | 1,475 | 1,043 | 573 | 1,555 | 1,870 | 948 | 968 |
| 180 | 1,338 | 1,145 | 813 | 445 | 1,215 | 1,440 | 750 | 758 |

TABLE 22

| Property | A8 | B8 | C8 | D8 | E8 | F8 | G8 | H8 |
|---|---|---|---|---|---|---|---|---|
| Tensile Strength (psi) | 82 | 100 | 75 | 47 | 646 | 840 | 683 | 860 |
| Elong'n (%) | 490 | 319 | 237 | 273 | 60 | 40 | 56 | 35 |

Example 12

In this example, the peel strengths (in pli) (pounds per linear inch) were measured for Samples A8–H8, identified below in Table 23, and the results are reported in Table 14. The term "Al" refers to an aluminum substrate. The term "PP" refers to polypropylene. The term "PE" refers to polyethylene. Reported in Table 25 are measured Saft to Kraft values in ° C. using 1"×1" and 500 grams.

TABLE 23

| Peel Strength | A9 | B9 | C9 | D9 | E9 | F9 | G9 | H9 |
|---|---|---|---|---|---|---|---|---|
| AL | 6.1 | 5.2 | 5.1 | 3.6 | 0.12 | 0.10 | 0.06 | 0.05 |
| PP | 7.9 | 2.4 | 6.1 | 3.7 | 0.01 | 0.01 | 0.01 | 0.01 |
| PE | 7.5 | 4.1 | 6.2 | 4.1 | 0.40 | 0.10 | 0.21 | 0.07 |

TABLE 24

| | A9 | B9 | C9 | D9 | E9 | F9 | G9 | H9 |
|---|---|---|---|---|---|---|---|---|
| Saft to Kraft | 60.9 | 91.8 | 56.9 | 69.3 | 76.5 | 99.5 | 71.8 | 86.4 |

Example 13

In this example, the hot melt adhesive (HMA) performances of various samples were measured and compared. In this example, the polymer samples used in Example 9 were modified by adding various combinations of certain ingredients to form adhesive compositions, namely, ESCOREZ 5380 (Ingr. #1), KAYDOL (Ingr. #2) and Irganox 1010 (Ingr. #4). Certain samples included isotactic polypropylene in addition to ethylene-propylene copolymer.

The compositions of the samples are shown in Table 25. The first column identifies the polymer samples from Example 9 used to make the modified Samples A10–G10, except that B6* was a different sample of the same type of polymer as sample B6 (Achieve), having a melt flow rate of 1500. Isotactic polypropylene was added to the Samples F6 and G6 ethylene-propylene copolymers, in the amount of about 50 wt % of the total polymer weight. The second column indicates the Brookefield viscosity (in cps) of each Example 9 polymer. The remaining columns reflect the weight percentages of the ingredients for each of Samples A10–G10.

TABLE 25

| Ex. 6 Sample | Visc. (x 000) | A10 | B10 | C10 | D10 | E10 | F10 | G10 |
|---|---|---|---|---|---|---|---|---|
| C6 | 49 | 30 | — | — | — | — | — | — |
| F6 | 60.5 | — | 30 | — | — | — | — | — |
| D6 | 28 | — | — | 30 | — | — | — | — |
| G6 | 25.1 | — | — | — | 30 | — | — | — |
| J6 | 153 | — | — | — | — | 30 | — | — |
| K6 | 19.0 | — | — | — | — | — | 30 | — |
| B6* | — | — | — | — | — | — | — | 30 |
| Ingr. #1 | — | 50 | 50 | 50 | 50 | 50 | 50 | 50 |
| Ingr. #2 | — | 20 | 20 | 20 | 20 | 20 | 20 | 20 |
| Ingr. #4 | — | 0.25 | 0.25 | 0.25 | 0.25 | 0.25 | 0.25 | 0.25 |

Example 14

In this example, the Brookefield viscosities (in cps) of the Example 15 samples (Samples A10–G10) were measured at different temperatures, and the results are reflected in Table 26 below, being identified as Samples A11–G11. Those same samples were also measured for tensile strength and elongation, and the results are shown in Table 27 below.

TABLE 26

| Temp (° C.) | A11 | B11 | C11 | D11 | E11 | F11 | G11 |
|---|---|---|---|---|---|---|---|
| 140 | 4,513 | 3,948 | 2,675 | 1,498 | 13,400 | 2,550 | 2,400 |
| 150 | 3,175 | 2,745 | 1,890 | 1,060 | 9,300 | 1,805 | 1,698 |
| 160 | 2,335 | 1,980 | 1,375 | 703 | 6,700 | 1,318 | 1,245 |
| 170 | 1,743 | 1,475 | 1,043 | 573 | 5,050 | 905 | 940 |
| 180 | 1,338 | 1,145 | 813 | 445 | 3,830 | 770 | 725 |

TABLE 27

| Property | A11 | B11 | C11 | D11 | E11 | F11 | G11 |
|---|---|---|---|---|---|---|---|
| Tensile Strength (psi) | 82.36 | 99.89 | 74.58 | 46.72 | 232 | 57 | 78 |
| Elong'n (%) | 489.5 | 318.65 | 236.87 | 272.8 | 1091 | 211 | 234 |

Example 15

In this example, the peel strengths (in pli) were measured for Samples A11–G11, identified below as Samples A12–G12, and the results are reported in Table 28. Reported in Table 29 are measured Saft to Kraft values in 0° C. using 1"×1" and 500 grams.

TABLE 28

| Peel Strength | A12 | B12 | C12 | D12 | E12 | F12 | G12 |
|---|---|---|---|---|---|---|---|
| AL | 6.1 | 5.2 | 5.1 | 3.6 | 4.2 | 4.7 | 3.8 |
| PP | 7.9 | 2.4 | 6.1 | 3.7 | 6.9 | 5.4 | 3.5 |
| PE | 7.5 | 4.1 | 6.2 | 4.1 | 2.2 | 5.1 | 5.7 |

TABLE 29

| | A12 | B12 | C12 | D12 | E12 | F12 | G12 |
|---|---|---|---|---|---|---|---|
| Saft to Kraft | 60.9 | 91.8 | 56.9 | 69.3 | 78 | 65 | 66 |

Example 16

In this example, modified samples were formulated, using certain polymers from Example 9 (as indicated) along with other polymer samples and ingredients, all identified as "components" below. Component 1-13 is ESCORENE UL7720 Component 2-13 is ESCOREZ 5400, Component 3-13 is ESCOREZ 5600, Component 4-13 is ECR 187, Component 5-13 is Paraflint H1, Component 6-13 is Sample E6 (from Example 9), Component 7-13 is Sample H6 (from Example 9), Component 8-13 is Sample 16 (from Example 9) and Component 9-13 is Irganox 1010 (an antioxidant). The weight percentages of the various components are identified in Table 30. Various properties of Samples A13–H13 were then measured, and the results are reported in Table 31.

TABLE 30

| Comp. | A13 | B13 | C13 | D13 | E13 | F13 | G13 | H13 |
|---|---|---|---|---|---|---|---|---|
| 1-13 | 30 | 30 | 30 | — | — | — | — | — |
| 2-13 | 22.5 | 22.5 | 22.5 | — | — | — | — | — |
| 3-13 | 22.5 | 22.5 | 22.5 | — | — | — | — | — |
| 4-13 | — | — | — | 70 | 70 | — | 60 | 60 |
| 5-13 | 25 | — | — | — | — | — | 10 | 10 |
| 6-13 | — | 25 | — | 30 | — | — | — | — |
| 7-13 | — | — | 25 | — | 30 | — | 30 | — |
| 8-13 | — | — | — | — | — | — | — | 30 |
| 9-13 | 1 | 1 | 1 | 1 | 1 | — | 1 | 1 |

TABLE 31

| Prop. | A13 | B13 | C13 | D13 | E13 | F13 | G13 | H13 |
|---|---|---|---|---|---|---|---|---|
| Visc @ 325 F. | 1,015 | 17,475 | 15,350 | 7,025 | 6,238 | — | 1,845 | 2,260 |
| Fiber Tear (%) | Substrate failure tear 100% | Cohesive failure 80%. Fiber tear 20%. Base failure. | Fiber tear 75%. Cohesive failure | Substrate failure. Fiber tear 100% | Substrate failure. Fiber tear 100% | — | 50% substrate failure. 50% fiber tear. | Substrate failure. Fiber tear 100% |
| SAFT (deg F.) | 186 | 148 | 149 | 207 | 231 | — | 206 | 204 |
| Tensile Strength (psi) | 591 | 407 | 426 | 617 | 548 | — | 257 | 330 |
| Tensile Elong'n (%) | 228 | 1855 | 690 | 0.3 | Snapped | — | 20 | 2.67 |
| Observations | — | — | — | Brittle | Brittle | — | Brittle | Brittle |

What is claimed is:

1. An adhesive composition comprising a semi-crystalline copolymer of propylene and at least one comonomer selected from the group consisting of ethylene and $C_4$ to $C_{20}$ α-olefins, wherein the copolymer has a propylene content of greater than 65 mole percent a weight average molecular weight (Mw) of from about 15,000 to about 200,000, a melt index (MI) of from about 7 dg/min to about 3000 dg/min as measured by ASTM D 1238(B), a weight average molecular weight/number average molecular weight ratio (Mw/Mn) of approximately 2, an MFR of greater than 250 dg/min. and a heat of fusion of from about 30 to about 80 J/g as determined by DSC.

2. The adhesive composition of claim 1, wherein the semi-crystalline copolymer has a propylene content greater than 73 mole percent.

3. The adhesive composition of claim it wherein the melt index of the semi-crystalline copolymer is from about 20 dg/min to about 900 dg/min.

4. The adhesive composition of claim 1, wherein the semi-crystalline copolymer has a random comonomer sequence distribution.

5. The adhesive composition of claim 1, wherein the semi-crystalline copolymer comprises isotactic polypropylene sequences.

6. The adhesive composition of claim 1, wherein the composition is a hot melt adhesive composition.

7. The adhesive composition of claim 1, further comprising a wax.

8. The adhesive composition of claim 1, further comprising at least one additive selected from the group consisting of a tackifier, an antioxidant and combinations thereof.

9. The adhesive composition of claim 1, wherein the semi-crystalline copolymer has a weight average molecular weight (Mw) of from about 50,000 to about 150,000.

10. The adhesive composition of claim 1, wherein the composition has a melt viscosity of less than 10,000 cps measured at 180° C.

11. An article of manufacture comprising the adhesive composition of claim 1.

12. The article of manufacture of claim 11, wherein the article of manufacture is a sanitary article.

13. An adhesive composition having an MFR greater than about 250 dg/min. at 230° C., the composition comprising a blend of a crystalline polymer and a random copolymer produced by copolymerizing propylene and at least one of ethylene and alpha-olefins having 20 or fewer carbon atoms, the random copolymer having a crystallinity of at least about 2% and no greater than about 65% derived from stereoregular polypropylene sequences and a melting point of from about 25° C. to about 105° C.

14. The adhesive composition of claim 13, wherein the crystalline polymer has a melting point greater than about 110° C.

15. The adhesive composition of claim 13, Wherein the crystalline polymer comprises polypropylene or a copolymer comprising propylene units and at least one comonomer selected from the group consisting of ethylene and $C_4$–$C_{20}$ α-olefins, the copolymer having a comonomer content of less than about 15 mole percent.

16. The adhesive composition of claim 13, wherein the crystalline polymer comprises isotactic polypropylene.

17. The adhesive composition of claim 13, wherein the crystalline polymer comprises isoractic polypropylene having a melting point greater than 110° C.

* * * * *